US010791168B1

United States Patent
Dilley et al.

(10) Patent No.: US 10,791,168 B1
(45) Date of Patent: Sep. 29, 2020

(54) TRAFFIC AWARE NETWORK WORKLOAD MANAGEMENT SYSTEM

(71) Applicant: Rafay Systems, Inc., Sunnyvale, CA (US)

(72) Inventors: John A. Dilley, Los Alto, CA (US); Haseeb Siddique Budhani, Menlo Park, CA (US); Rupinder Singh Gill, Carrara (AU); Bheema Sarat Chandra Kaki, Sunnyvale, CA (US); Hanumantharao Kavuluru, San Jose, CA (US); Yu hong Andy Zhou, Gilroy, CA (US)

(73) Assignee: Rafay Systems, Inc., Sunnyvale, CA (US)

( * ) Notice: Subject to any disclaimer, the term of this patent is extended or adjusted under 35 U.S.C. 154(b) by 10 days.

(21) Appl. No.: 16/418,384

(22) Filed: May 21, 2019

Related U.S. Application Data

(60) Provisional application No. 62/674,493, filed on May 21, 2018.

(51) Int. Cl.
*H04L 29/08* (2006.01)
*H04L 12/24* (2006.01)

(52) U.S. Cl.
CPC .......... *H04L 67/1031* (2013.01); *H04L 41/22* (2013.01); *H04L 67/1008* (2013.01); *H04L 67/288* (2013.01)

(58) Field of Classification Search
CPC ... H04L 67/1031; H04L 41/22; H04L 67/108; H04L 67/288
See application file for complete search history.

(56) References Cited

U.S. PATENT DOCUMENTS

| 5,630,129 A | 5/1997 | Wheat |
| 6,167,438 A | 12/2000 | Yates et al. |

(Continued)

FOREIGN PATENT DOCUMENTS

| WO | WO-2013085703 A1 | 6/2013 |
| WO | WO-2014071094 A2 | 5/2014 |

(Continued)

OTHER PUBLICATIONS

"Overview of a Pod, Services, Replication", Kubernetes on CoreOS, [Online] Retrieved the Internet: <URL: https://coreos.com/kubernetes/docs/latest/pods.html>, (Retrieved on Mar. 11, 2019), 10 pgs.

(Continued)

*Primary Examiner* — El Hadji M Sall
(74) *Attorney, Agent, or Firm* — Schwegman Lundberg & Woessner, P.A.

(57) ABSTRACT

A system is provided to manage operation of workloads over a workload placement network comprising: a user interface to receive workload placement specifications that indicate locations; a data storage device storing cluster location information; a workload placement manager to determine placement of workloads at clusters based at least in part upon cluster locations and cluster resource utilization; wherein the clusters include metrics collector instances to collect information indicating cluster resource utilization and to send the collected information over the workload placement network to the placement the orchestration manager.

66 Claims, 15 Drawing Sheets

(56) References Cited

U.S. PATENT DOCUMENTS

| | | |
|---|---|---|
| 6,185,601 B1 | 2/2001 | Wolff |
| 6,754,699 B2 | 6/2004 | Swildens et al. |
| 6,823,377 B1 | 11/2004 | Wu et al. |
| 7,236,799 B2 | 6/2007 | Wilson et al. |
| 7,426,546 B2 | 9/2008 | Breiter et al. |
| 7,523,181 B2 | 4/2009 | Swildens et al. |
| 7,590,984 B2 | 9/2009 | Kaufman et al. |
| 8,296,434 B1 | 10/2012 | Miller et al. |
| 8,626,946 B2 | 1/2014 | Kamath et al. |
| 8,745,221 B1 | 6/2014 | Willbanks |
| 8,949,428 B2 | 2/2015 | Dow et al. |
| 8,972,986 B2 | 3/2015 | Palanisamy et al. |
| 9,075,657 B2 * | 7/2015 | Jackson ............... G06F 9/5027 |
| 9,197,549 B2 | 11/2015 | Kumar et al. |
| 9,317,336 B2 | 4/2016 | Alicherry |
| 9,537,973 B2 | 1/2017 | Batrouni et al. |
| 9,584,423 B2 | 2/2017 | Deshmukh |
| 9,680,708 B2 | 6/2017 | Kasturi |
| 9,979,657 B2 | 5/2018 | Batrouni et al. |
| 10,025,627 B2 | 7/2018 | Ferris |
| 10,120,669 B2 | 11/2018 | Karagiannis et al. |
| 10,365,977 B1 * | 7/2019 | Gould ............... G06F 11/1484 |
| 2005/0256971 A1 | 11/2005 | Colrain et al. |
| 2008/0140840 A1 | 6/2008 | Hamilton et al. |
| 2012/0131181 A1 | 5/2012 | Birkler et al. |
| 2014/0089459 A1 * | 3/2014 | Werr .................. H04L 67/06 709/217 |
| 2015/0288597 A1 | 10/2015 | Wang et al. |
| 2016/0189444 A1 * | 6/2016 | Madhok ................ G07C 5/02 701/36 |
| 2017/0134520 A1 | 5/2017 | Abbasi et al. |
| 2018/0167483 A1 | 6/2018 | Cannon et al. |
| 2020/0050494 A1 * | 2/2020 | Bartfai-Walcott ...... H04L 67/10 |

FOREIGN PATENT DOCUMENTS

| | | |
|---|---|---|
| WO | WO-2015036943 A1 | 3/2015 |
| WO | WO-2016079633 A1 | 5/2016 |
| WO | WO-2018144060 A1 | 8/2018 |

OTHER PUBLICATIONS

"Pods", Kubernetes Documentation, [Online] Retrieved from the Internet: <URL: https://kubernetes.io/docs/concepts/workloads/pods/pod/>, (Retrieved on Mar. 11, 2019), 9 pgs.

"What is Kubernetes?", Kubernetes Documentation, [Online] Retrieved from the Internet: <URL: https://kubernetes.io/docs/concepts/overview/what-is-kubernetes/>, (Retrieved on Mar. 11, 2019), 6 pgs.

Gaun, Chris, "Introducing Mesosphere Kubernetes Engine (MKE)", D2IQ Blog, [Online] Retrieved from the Internet: <URL: https://d2iq.com/blog/introducing-mesosphere-kubernetes-engine-mke>, (Oct. 26, 2018), 7 pgs.

* cited by examiner

TRAFFIC AWARE NETWORK WORKLOAD MANAGEMENT SYSTEM

RELATED APPLICATIONS

The present application claims the benefit of U.S. Provisional Patent Application, Ser. No. 62/674,493, filed May 21, 2018, entitled, "Traffic-Aware Workload Management System".

BACKGROUND

Cloud computing providers typically have large, 'hyperscale' data centers with many computers providing a multi-tenant compute platform with resource isolation, so that tenants sharing the platform do not interfere too greatly with each other. Hardware and virtual machine (VM) scaling solutions allow workloads to adjust resource usage as needed to accommodate changes in demand. A cloud compute service ordinarily provides computer services to users on demand via the Internet from a cloud computing provider's servers. A cloud computing service generally provides access to provision and manage applications, resources and services, using an interface defined by the cloud services provider. Often, different cloud computing service providers provide different provisioning and management interfaces to applications. In many cloud computing services, a cloud service can be configured to dynamically scale certain applications based on performance or traffic measures. Typical characteristics of cloud services include self-provisioning and elasticity. That is, customers can provision services on their own via a cloud provider interface, such as a web graphical user interface (GUI) or application programmatic interface (API), on an on-demand basis and shut them down when no longer necessary. Examples of cloud services include online data storage and backup solutions, Web-based e-mail services, hosted office suites and document collaboration services, database processing and managed technical support services.

Often, cloud services are user self-provisioning. A cloud compute provider ordinarily relies upon users/customers to provide software and data placement instructions, generally to identify the cloud machine details and data center location to which an application service is to be provisioned. In some public clouds, user self-provisioning can take place over the Internet. In some enterprises, an IT organization will establish a portal application that business unit leaders and end users can utilize to request the resources necessary to run a new application. Some cloud providers, particularly those that cater to smaller businesses, provide self-provisioning portals to customers.

A public cloud service typically is one based on a cloud computing model in which a service provider makes resources, such as VMs, applications or storage, available to the general public over the Internet. Public cloud service providers usually provide a multi-tenant architecture that enables users—or tenants—to share computing resources, although each tenant's data in the public cloud ordinarily remains isolated from other tenants. A public cloud generally relies on high-bandwidth network connectivity to rapidly transmit data.

A content delivery network (CDN) provides edge delivery of static content to end users by caching that content on CDN edge server locations following a first request for that content, and serving it from a local cache upon subsequent requests, saving the time to re-fetch that content from a possibly distant 'origin' server. Content includes information such as music, videos and podcasts, for example. A CDN also can accelerate requests for un-cached content by finding optimized routes across the Internet back to the application that holds or generates that content. Un-cached content includes dynamically generated content or content that has not been fetched previously to that CDN location. A CDN system measures traffic demand for content and directs end users to CDN edge servers to prevent resource exhaustion while meeting network latency and other objectives. A CDN edge server delivers content in response to a user request.

Public cloud services tend to utilize relatively few locations with many machines in each one. By contrast, most CDN providers place fewer servers in many, smaller clusters with wide geographic distribution to improve responsiveness for end users by being geographically nearby. Being nearby improves responsiveness because each end user interaction typically requires multiple round-trip interactions with the server providing the content or application service. A nearby server can respond more quickly, reducing individual round-trip times and can significantly improve the response time for the interactions. A typical web request may result in hundreds to thousands of round trips to complete a 'page load' interaction, for example. CDNs adjust steering of requests to data center locations—but not placement of content, which is generally done by demand-loading content upon end user request. Cloud providers ordinarily do not adjust placement of VMs (or applications) at different locations based on end user request traffic volume. Cloud providers ordinarily do not adapt application placement based upon changing end user traffic patterns over time, such as where the end users are located at a given moment.

There exists a need to more easily place applications across many cloud provider instances, as different providers generally have different provisioning and management interfaces, requiring substantial learning by an application operations team. There exists a further need to more easily provision applications to run in one or more dynamically selected locations. Cloud provider provisioning, as exists today, generally cannot easily adjust the placement of applications based upon end user interactions, the way a CDN places content based upon end user interactions. CDN placement typically accommodates cacheable (static) content, not dynamic application content. Moreover, CDN requests for dynamic content ordinarily are directed from a CDN edge server over a network to the application that holds or generates that content.

BRIEF DESCRIPTION OF DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals and/or letters in the various examples. This repetition is for simplicity and clarity and does not in itself dictate a relationship between the various embodiments and/or configurations discussed.

DETAILED DESCRIPTION

Figure 1:
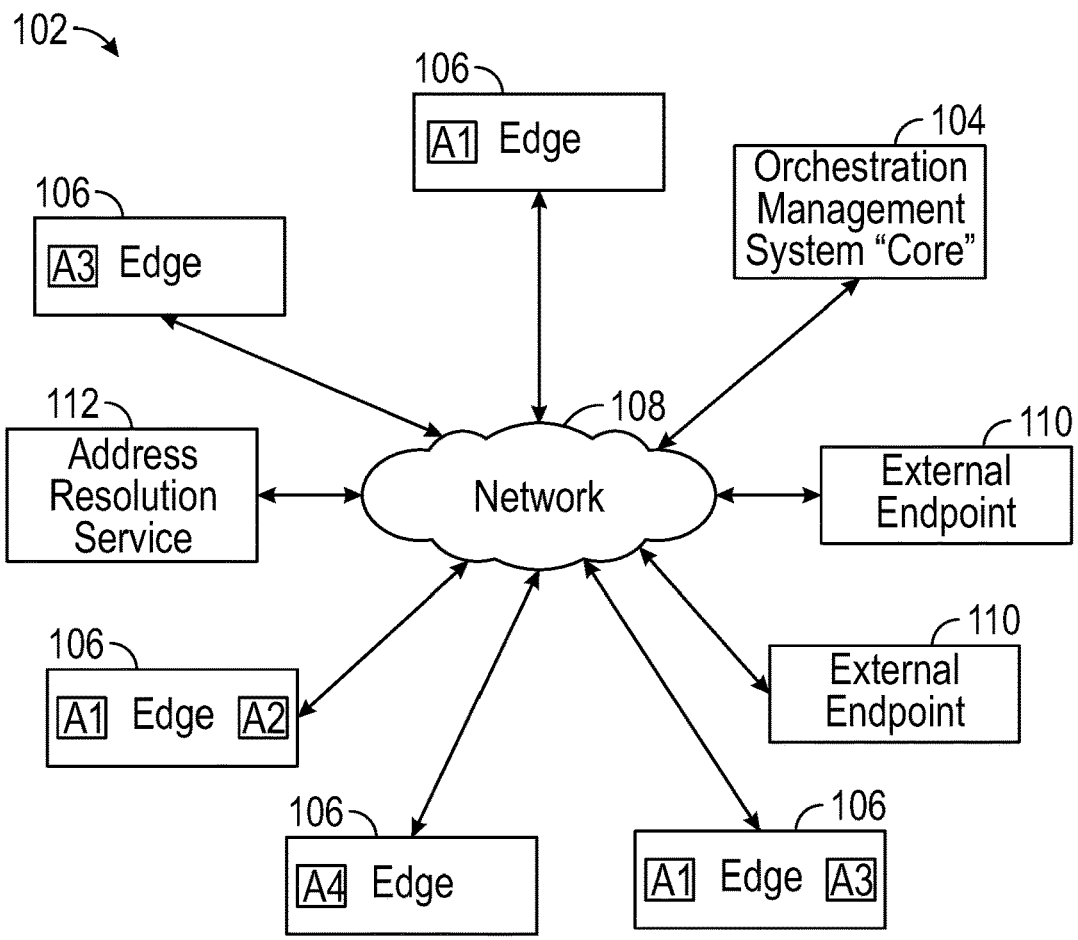
FIG. 1 is an illustrative drawing showing an example network workload management system.

Overview FIG. 1 is an illustrative drawing showing an example network workload management system 102. The system 102 includes a placement orchestration manager 104 and a plurality of clusters 106 that are coupled to the orchestration manager 104 over a communication network 108 and that host tenant applications (e.g., A1-A4) accessible by external endpoint devices 110 over the network 108. In an example network workload management system 102, the network 108 includes the Internet which includes wired and wireless network connections. Tenant applications also are referred to herein as 'workloads'. The manager 104 orchestrates the placement of tenant applications over the network 108 at the clusters 106, also referred herein as to as 'edges' or edge clusters. The network 108 over which workloads are placed to clusters 106 is referred to herein as a 'workload placement network' 108. Some example cluster locations are distributed across a large geographic area, and into many end ISP networks, such as to place them at the so-called "edge" of the network. Other cluster locations are placed within data centers owned by an enterprise organization, or within a cloud provider data center, or a combination of both. Thus, edges include clusters but not all clusters are located at network edges. The manager 104 determines scheduling of resource utilization during execution of tenant applications placed at the edges 106. The manager determines steering of tenant application requests over the workload placement network 108 to edges hosting the tenant applications. Edges 106 that host more than one tenant application maintain isolation of tenant applications from one another. Tenant applications owners provide input at one or more computer user interfaces (not shown) to specify placement and scheduling parameters to produce a configuration specification used by the orchestration manager 104 to determine placement and scheduling of tenant applications.

As used herein, the term 'endpoint device' refers to a device coupled to one end of a network connection. An endpoint device also is referred to herein simply as an 'endpoint'. As used herein, an 'external endpoint device' refers to an endpoint device that is external to the network workload management system and that couples to the system to access a tenant application placed at an edge 106. An edge data center coupled to an external endpoint is itself an endpoint. Example external endpoints include a web browser with a graphical user interface, which is typically used by a human end user; a mobile device such as a smart phone with a set of communicating applications, any of which applications could act as an endpoint to one or more system instances; or another form of device with computation and communication capabilities, with or without a graphical interface. A device on which an external endpoint runs may itself be embedded in another device or system, such as a communication application embedded within an automobile.

An administrative user interface (UI), described below, at manager 104 allows a tenant/application (workload) owner to specify what code to publish to one or more edges 106 via one or more offered interaction mechanisms, which may include a graphical user interface (GUI), a command line interface (CLI), an application programmatic interface (API). The administrative interface allows the tenant to create a configuration specification to specify attributes of a tenant application such as, in some cases, a tenant application hostname and parameters to indicate preferences as to placement and scheduling of the tenant application.

Thus, the network workload management system 102 masks underlying infrastructure distinctions, allowing tenant workloads to run seamlessly across many providers, at edges in dispersed geographic locations, with a single administrative application control interface. This benefits tenant application owners by simplifying the challenge of running tenant workloads closer to external endpoints 110, for example when such external endpoints are widely distributed across different cities, states, countries or continents, for example, which require placement of applications across many such infrastructure providers.

The example network workload management system 102 hosts multiple different tenant applications (A1-A4). Different tenant applications provide different application services to external endpoint devices 110. The different example tenant applications can be hosted on different edge data centers. Some example edge data centers 106 host multiple tenant applications. Some example edge data centers 106 host a single tenant application. External endpoint devices 110 access individual tenant applications by requesting network connections (not shown) with edge data centers hosting the individual tenant applications. In an example system, control channels (not shown) are set up over network connections created between edge data centers 106 and the orchestration manager 104. Individual edge data centers send data to the orchestration manager 104 and receive control commands from the orchestration manager over individual network communication control channels. As used herein, the term 'tenant' refers to an owner (e.g., a person or a company) of an application hosted on the system. Tenants specify application performance requirements via the administrative UI for their individual tenant applications, which can include geographic location, network communication latency, time of use, application sizing and resource usage preferences, for example. Different tenant applications typically have different performance requirements. The performance requirements of some tenant applications change over time. From time to time, for example, a tenant may adjust the performance requirements of a tenant application. Based upon tenant-specified performance requirements, the orchestration manager 104 orchestrates placement of tenant applications at edge data centers 106 steers external endpoint requests to edges where requested tenant applications are placed, and schedules execution of tenant applications at the edges. Depending upon tenant specified performance requirements, some example tenant applications share resources at some edge data centers 106 during some time intervals, and some example tenant applications have exclusive use of some edges during some time intervals. The edges 106 maintain isolation of different tenant applications from one another. For example, tenant applications that share an example edge 106 are isolated through one or more of operating system features that limit the amount of resources they can use, for example by time slicing central processing unit (CPU) time, network bandwidth, and disk access; or providing hard limits on amount of disk or memory storage used, for example.

Based on factors such as one or more of message rate, resource utilization within edge data centers, and communication latency, the orchestration manager places a tenant application (also commonly called a workload) to run in more, fewer, or different edge data centers 106 over time. An example orchestration manager 104 adjusts tenant application placement at edge data centers 106 based upon factors including variations in endpoint demand and variations in edge data center resource availability. The orchestration manager 104 re-evaluates placement determinations periodically such as every thirty seconds to five minutes, for example, to take into account changes in demand, utilization, and cost functions, for example. The orchestration manager tracks resource usage of currently existing edges, adjusts edge resource allocation as needed to meet current and expected traffic needs, determines where tenant applications should be placed, which placed tenant applications should receive application traffic, and updates traffic direction on an ongoing basis.

An example workload orchestration manager 104 includes a number of components described below, including among them facilities to monitor resource utilization, determine appropriate tenant application placement, and to steer traffic towards the appropriate, active edge data center locations. Thus, workload placements are adjusted when necessary to meet tenant preferences set forth in workload specifications. For example, a tenant application can be placed at an additional edge 106 in response to increased demand for the tenant application. Conversely, for example, a tenant application can be evicted from an edge 106 in response to reduced demand for the tenant application. The orchestration manager 104 receives status information from a plurality of edges and determines how best to adjust tenant application placements based at least in part upon the set of available edges to run a set of tenant applications.

An example orchestration manager 104 manages placement of tenant applications at edge data centers based at least in part upon individual tenant application owner specified performance factors. Edge data centers 106 of some example network workload management systems 102 are located in different countries. Edge data centers 106 of some example systems 102 are located at geographically distributed locations such as in different states, in different locations within different states, and in different locations within a city. Depending at least in part upon tenant application owner preferences, an example orchestration manager 104 can place a respective tenant application at a single edge data center, or at multiple edge data centers. Depending at least in part upon tenant application owner preferences for different tenant application, an example orchestration manager can place instances of multiple different tenant applications at some edge data centers 106.

An example network workload management system 102 directs messages from an external endpoint 110 requesting access to a tenant application, e.g., A1, A2, A3, or A4, to an edge data center 106 hosting the tenant application. An example orchestration manager 104 includes a hostname-based global traffic message (GTM) manager, described below, to steer external endpoint requests for access to tenant applications received over the workload placement network 108 to edge data centers 106 where tenant applications are hosted. An example message manager directs messages from external endpoints 110 to appropriate edges 106 by resolving hostnames associated with tenant applications. An example DNS service 112 provides edge-identifying information that identifies edges 106 that host requested tenant applications. A requesting endpoint 110 uses such edge-identifying information to send a message to an identified edge 106 to request access to a requested application hosted by the edge.

In an example network workload management system 102, the edge-identifying information includes IP addresses returned by an external Domain Name System (DNS) service 112 operably coupled to the system 102. In another example network workload management system, external endpoints 110 locate an appropriate edge 106 through direct network communication with the orchestration manager 104, which has information about edge and endpoint network locations and information such as network communication latency that is relevant to steering of external endpoint requests to edges that can most efficiently handle the requests. A determination as to which edge 106 is most appropriate to handle a request at a given moment in time is based at least in part upon external endpoint location, the time it takes for data to travel from the external endpoint to a given edge ("latency"), and the load on edges nearby to a requesting external endpoint, for example.

Thus, an example network workload management system 102 makes it easier for a tenant application owner to distribute and execute an appropriate number of application replicas to one or more edge data centers 106. The system schedules one or more hosted applications placed at an edge to efficiently use edge resources consistent with tenant specified performance levels. The system steers requests for access to tenant applications to the most appropriate edges, such that external endpoints 110 can access the hosted applications with tenant-specified levels of performance. The system maintains isolation of tenant applications sharing an edge 106.

Placement costs are managed by automatically scaling the placement and execution of applications based upon external endpoint demand.

Figure 2:
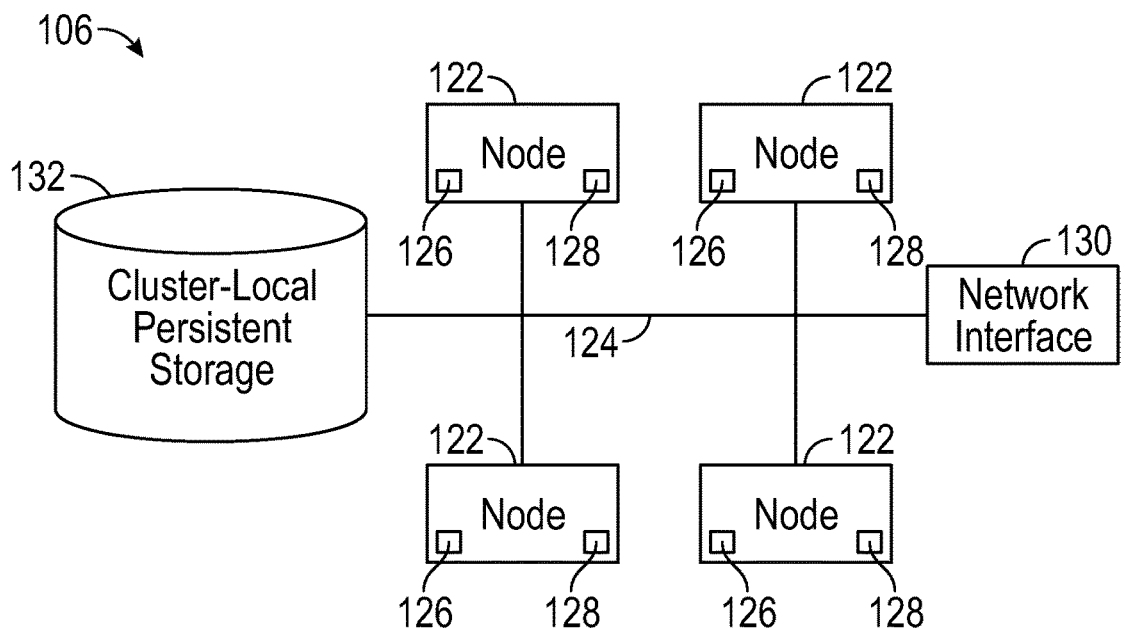
FIG. 2 is an illustrative drawing showing a hardware representation of an example edge data center of FIG. 1.

Edge Data Center Hardware FIG. 2 is an illustrative drawing showing a hardware representation of an example edge data center 106 of FIG. 1. The example edge 106 includes a cluster of nodes 122. Each edge 106 in the network workload management system 102 includes a node cluster including one or more nodes 106. The example cluster includes multiple nodes coupled to communicate over a local communication network 124. Each node includes hardware and software and includes one or more processors 126 and associated local memory devices 128 such as cache storage to hold instructions executed by the processors 126 and to hold data, a network interface 130 to send and receive messages over the local cluster communication network 124, and an associated persistent memory storage device 132 to persistently store instructions and data. The orchestration manager 104 places a tenant application, also referred to as a workload, to run on a cluster of nodes 122 at an edge 106. An example edge 106 is configured to implement a set of message control and direction services that determine which node 122 in a cluster of nodes at the edge is to handle each external endpoint message. It will be appreciated that servicing an external endpoint request for access to a workload typically involves transmission of multiple messages back and forth over the workload placement network 108 between a requesting external endpoint 110 and an edge 106 hosting the workload. In some examples, a cluster of nodes 122 is configured to operate workloads packaged as one or more containers. In other examples, a cluster of nodes 122 is configured to operate workloads packaged as one or more virtual machines. In this document, the term 'code package' refers to a workload (a tenant application) packaged to run on clusters of nodes 122 at one or more of edges 106 to implement the application at each of the edges. For instance, code of an example workload is packaged in one or more containers (sometimes referred to as a 'containerized application') in which the code within each container configures a different node 122 to provide a different micro-service. An example workload includes one or more code packages that implement workload functions to be executed at an edge data center 106. In one example containerized workload, all containers run on a single node 122; in another example containerized workload, a workload's containers are divided among multiple nodes on which to run. Messages received from external endpoints 110 are presented to the one or more nodes 106 configured to execute an appropriate code package based upon the workload's configuration.

A tenant workload runs on one or more nodes within a shared context at an edge data center 106. An example shared context includes a shared network address space, shared port space, and shared storage volumes. A tenant workload is associated with a configuration specification that indicates the workload performance preferences such as a workload's resource limits within the edge data center such as central processor unit usage limits and RAM storage limits. One or more nodes 122 of an example edge data center are configured to act as a controller to schedule execution of a tenant workload's code packages within a shared context consistent with a configuration specification associated with the workload. A tenant-created configuration specification specifies how to run the tenant workload within an edge data center where the workload is placed.

The compute and storage resources of a cluster of nodes 122 within an example edge data center 106 typically is either provisioned by a service provider owner of an orchestration manager 104, or by a third-party provider of the cluster of nodes that operates computer infrastructure as a service (IaaS). Some example edge data center systems 106 span a number of service providers or third-party provisioned edge data centers, each provisioned with a requisite number of nodes 122, which are orchestrated by an orchestration manager 104 to behave as an edge data center. Thus, an example network workload management system 102 can expose a number of edges 106 across a number of geographies and heterogeneous environments. In one example network workload management system 102, an orchestration manager 104 behaves as a hub in a hub-and-spoke model in which the edge data centers are spokes wherein status and control messages traverse the spoke-to-hub and hub-to-spoke network connections between the orchestration manager 104 and the edge data centers 106. In another example network workload management system 102, messages to access a workload are sent over the workload placement network 108 by external endpoints 110 as directed by the orchestration manager traffic steering service, which directs the requests to appropriate edges (spokes) to be served by workloads operating therein.

Edge Node Software Architecture

Figure 3:
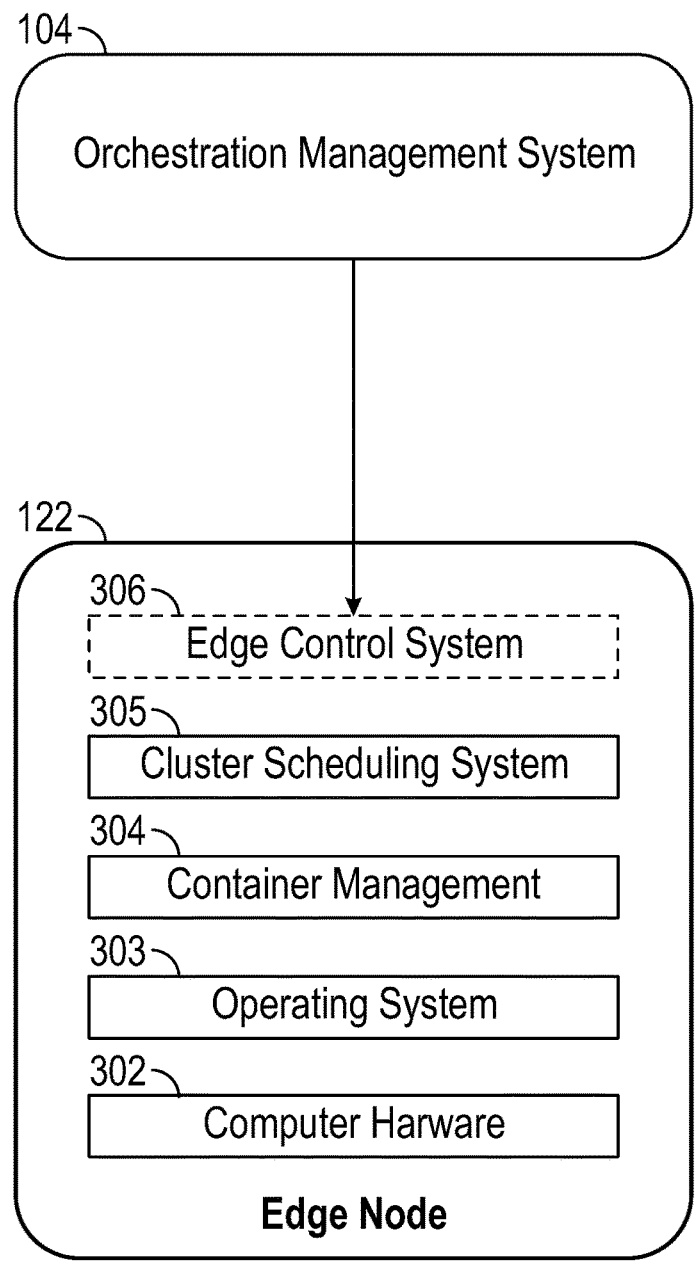
FIG. 3 is an illustrative drawing representing software module layers of an example edge node of FIG. 2.

FIG. 3 is an illustrative drawing representing hardware and software module layers of an edge node 122 of FIG. 2. The example edge node 122 includes a hardware layer 302 that includes a server system with one or more processors, storage memory, both dynamic (random access memory) and persistent (disk medium) storage and a network interface as explained above. An example operating system layer 303 includes software to manage basic server operations such as Linux, Windows, MacOS, for example. An example container scheduling layer 304 includes a management layer such as a Docker management layer or a 'containerd' management level, for example. An example scheduling layer 305 includes a Kubernetes workload management layer or a Mesos workload management layer, for example.

In operation, each edge node 122 includes processor hardware that runs an operating system, container and cluster scheduling and management software, and tenant workloads. The container management system layer 304 manages the execution of software containers, including controlling each container's access to storage, memory, and processing resources in order to support a multi-tenant compute platform. The cluster scheduling layer 305 manages the placement of containers on nodes according to configuration settings. The cluster scheduling layer 305 detects container and node status, starts code containers on nodes according to load and other preferences expressed in container configuration settings, and restarts containers that have exited unexpectedly. An edge control system layer 306 interacts with the orchestration manager 104 and invokes the services of the cluster scheduling system layer 305 via an API that it provides to configure and run the appropriate application workloads as determined by the orchestration manager 104. Runtime configuration determines what role each node 122 plays at an edge 106 (e.g., whether it acts as a cluster master control node or runs an application workload or both), and which and how many application workloads run on the node 122.

The interaction between an example orchestration manager 104 and the cluster scheduling system layer 305, via the edge control system 306, provides multi-level orchestration, where the orchestration manager 304 decides which workloads to place in individual edge clusters, and the edge control system layer 306 schedules workloads to run on the worker nodes 122 in those clusters. This orchestration can occur across many cloud providers, simplifying administration of widely distributed applications.

Example Edge Node Cluster Runtime Logical Configuration

Figure 4:
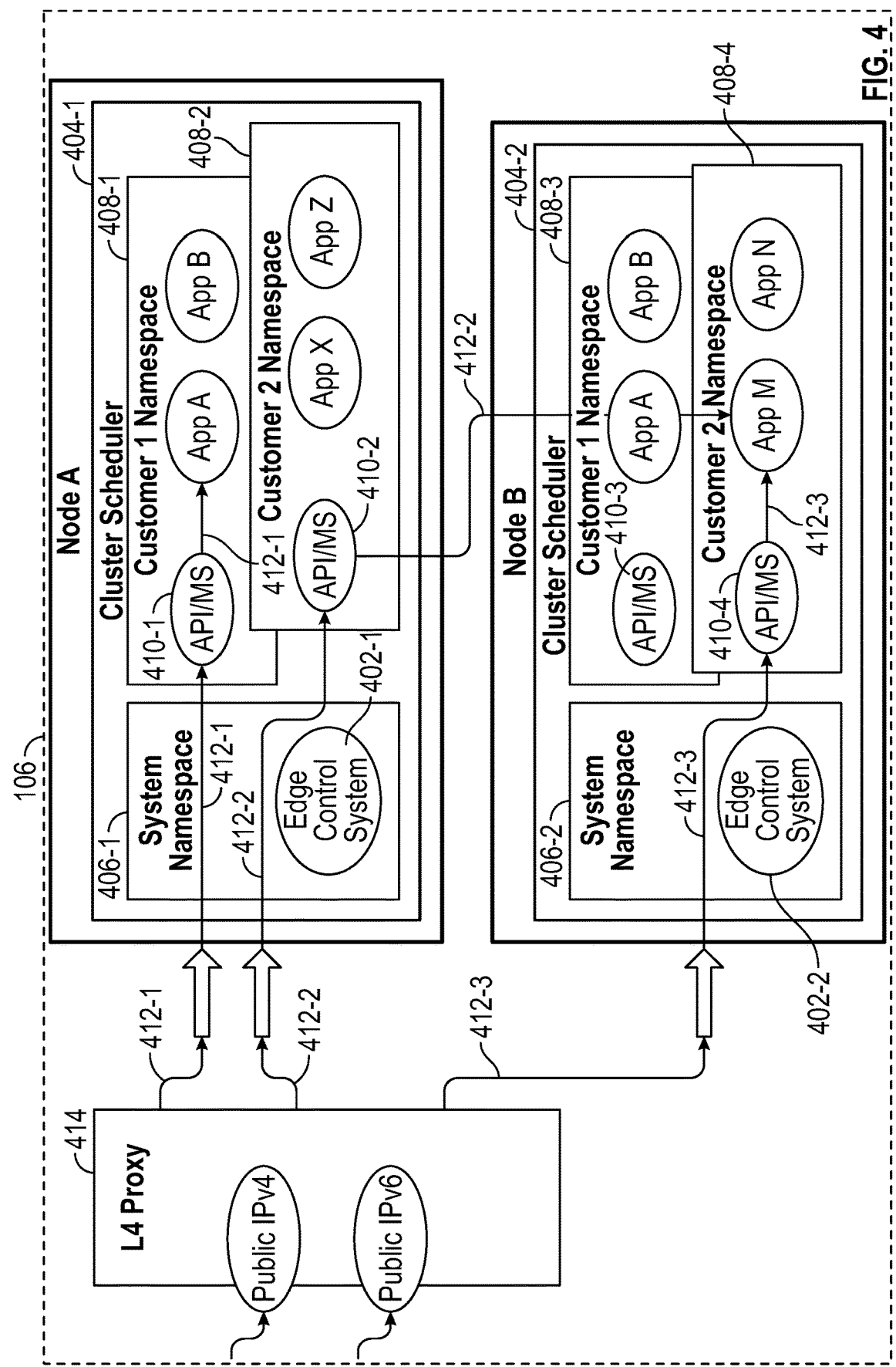
FIG. 4 is an illustrative drawing representing an example runtime logical configuration of an edge cluster to schedule and operate tenant workloads placed at an example edge of the system of FIG. 1.

FIG. 4 is an illustrative drawing representing an example runtime logical configuration of a node cluster at an edge data center 106 to schedule and operate tenant workloads placed at an example edge in the system of FIG. 1. The example edge node cluster 106 includes two nodes, node A and Node B, that that host workloads for two tenants, Customer 1 and Customer 2. The example edge 106 is logically configured with software to include control function module instances 402-1, 402-2, scheduler instances 404-1 to 404-4, network system namespaces 406-1, 406-2, network workload namespaces 408-1 to 408-4, API/MS module instances 410-1 to 410-4, network communication paths 412-1 to 412-3, and sets of code packages (App A, App B, App X, App Z, App M, App N). The example edge 106 includes two nodes, node A and node B that together host six exemplary workloads where App A and App B, which belong to tenant Customer 1, that run one copy of each application workload on each of the two nodes (node A and node B) in the system; and App X, App Y, App M, and App N, which belong to tenant Customer 2, that run a single instance on one of the nodes. An instance of each of App X and App Z runs on node A, and an instance of each of App M and app N runs on node B. The specific layout of application workloads to nodes is determined by configuration, and the logical configuration shown in FIG. 4 is merely an illustration of one of many possible logical configurations that can be chosen based upon application owner preferences, node resource availability, and other considerations.

Each edge node is configured to the role each node plays at runtime (e.g., whether it is a cluster master control node or runs customer workload code), and which and how many customer applications run on the node. The control functions may or may not run on any given node. The illustrative logical configuration of FIG. 4 shows system namespace running on both nodes, as one example.

The logical configuration of an edge 106 includes edge control functions in a system namespace, including the edge control system instances 402-1, 402-2 that provide connectivity to the external orchestration manager 104, metrics and log management, and other functions as disclosed herein, and to include scheduler instances 404-1, 404-2. API/MS module instance is configured to run within each separate network workload namespace to facilitate communication between the endpoint and the application workload. An API/MS module instances 410-1 to 410-4 provide message routing services to dispatch messages to the appropriate code package within the edge cluster, or possibly to a different location, as described under Network Data Path.

Example scheduler instances 404-1, 404-2 are configured to operate on each of node A and node B. The scheduler instances provide the following services:

Configure network policies and appropriate network namespaces to create a multi-tenant environment within the cluster prior to scheduling tenant code.

Configure cluster node local storage volumes and associate them to the tenant's namespace, prior to scheduling code, such that persistent storage memory is available within the cluster for use by the code.

Schedule code, in a code package in this example, to execute on one or more nodes according to configuration settings determined by the orchestration management system based upon application owner preferences.

Monitor code packages and provide the status, health and performance metrics to the orchestration management system to track behavior of code running in this cluster.

Restart code packages that have failed unexpectedly, or that are in poor health. Again, providing information about this as a metric to the orchestration management system.

Manage upgrades of code packages when the code package or configuration is changed, for example by starting a new code package, waiting for it to become ready, and then stopping the old code package.

Implement graceful cleanup of code when a code package is removed from the cluster.

The orchestration manager 104 determines whether to instruct a given edge, containing a node cluster, to schedule and run a given code package based upon application owner preferences and feedback from the cluster scheduler to the orchestration manager prior to selection of that edge. An example configuration includes a workload management layer, code configuration settings, and sensitive information stored as secrets in a key management infrastructure.

Each edge includes at least one proxy server instance 414 to manage network connections between external endpoints 110 and code packages placed within the edge, for example. More particularly, the example edge 106 of FIG. 4 includes an L4 network proxy server 414 that performs Layer-4 termination of external endpoint connections to direct messages to appropriate nodes within a node cluster at the edge. The L4 proxy functionality runs in one or more containers in the edge, much like other workloads, but in a system namespace. The system namespace can be separated from customer workloads or other system control functions, if desired, or allowed to run alongside customer workloads.

The example logical edge configuration in FIG. 4 depicts a first TCP tunnel 412-1 between a connection with a first external endpoint (not shown) at the IPv4 port of the network proxy server 414 and a first API/MS 410-1 in the first network workload namespace 408-1 of node A and between the first API/MS 410-1 in the first network workload namespace 408-1 node A and a set of code packages App A in the first network workload namespace 408-1 node A. The example logical edge configuration also depicts a second TCP tunnel 412-2 between a second external endpoint (not shown) at the IPv4 port of the proxy server 414 and a second API/MS 410-2 in the second network workload namespace 408-2 of node A and between the API/MS 410-2 in the second network workload namespace 408-2 of node A and a set of code packages App M in the second network workload namespace 408-4 of node B. The example logical edge configuration further depicts a third TCP tunnel 412-3 between a third external endpoint (not shown) at the IPv6 port of the proxy server 414 and a second API/MS 410-4 in the second network workload namespace 408-4 of node B and between the API/MS 410-4 in the second network workload namespace 408-4 of node B and a set of code packages App M in the second network workload namespace 408-4 of node B.

Figure 5:
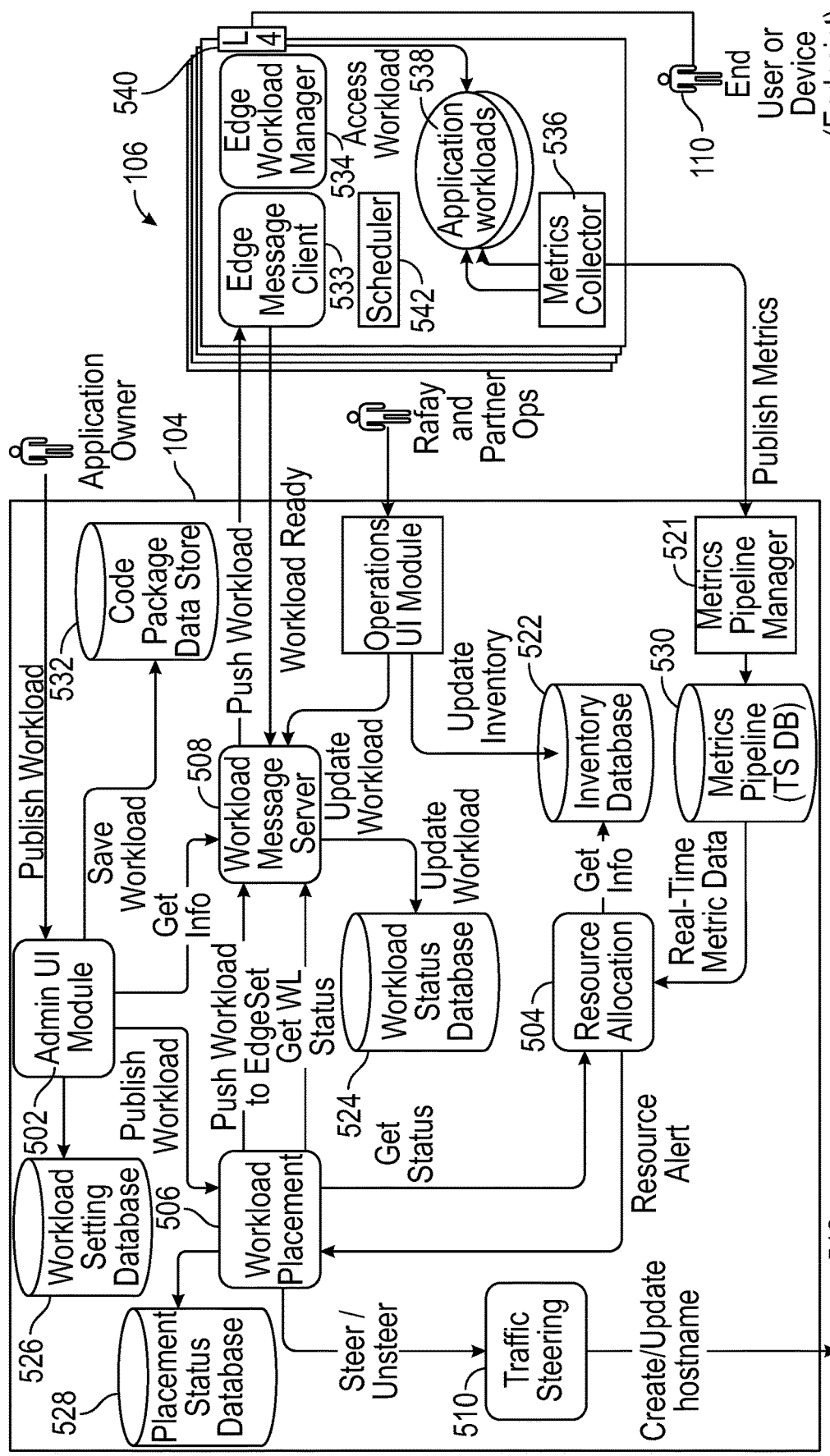
FIG. 5 is an illustrative example system level diagram showing communication paths among components of an orchestration manager and between the orchestration manager and multiple edge data centers of FIG. 1.

Network Workload Management System Architecture FIG. 5 is an illustrative example system level diagram showing communication paths among components of an example orchestration manager 104 and between the orchestration manager 104 and multiple edge data centers 106, of FIG. 1. The orchestration manager 104 includes one or more administrative UI modules 502, an edge resource allocation manager 504, a workload placement manager 506, a workload message server 508, and a traffic steering manager 510. The traffic steering manager 510 is coupled to communicate over a communication network (not shown) with an external domain name service (DNS) system 512. The orchestration manager 104 includes a memory storage device that stores an inventory database 522, a memory storage device that stores a workload runtime workload status database 524, a memory storage device that stores an application owner workload settings database 526, a memory storage device that stores a placement status database 528, a metrics pipeline manager 521 manages storage of feedback metrics received from edge clusters to a memory storage device that stores one or more feedback metrics pipelines 530, and a memory storage device that holds a workload code package data store 532.

An example orchestration manager 104 is physically implemented using one or more nodes in a single data center, from which it controls one or more edges 106, which may be collocated with the orchestration manager 104, or in one or more separate locations. Another example orchestration manager 104 is physically decomposed into a plurality of node locations, such that the orchestration manager does not have a single physical, or geographic location.

Figure 6:
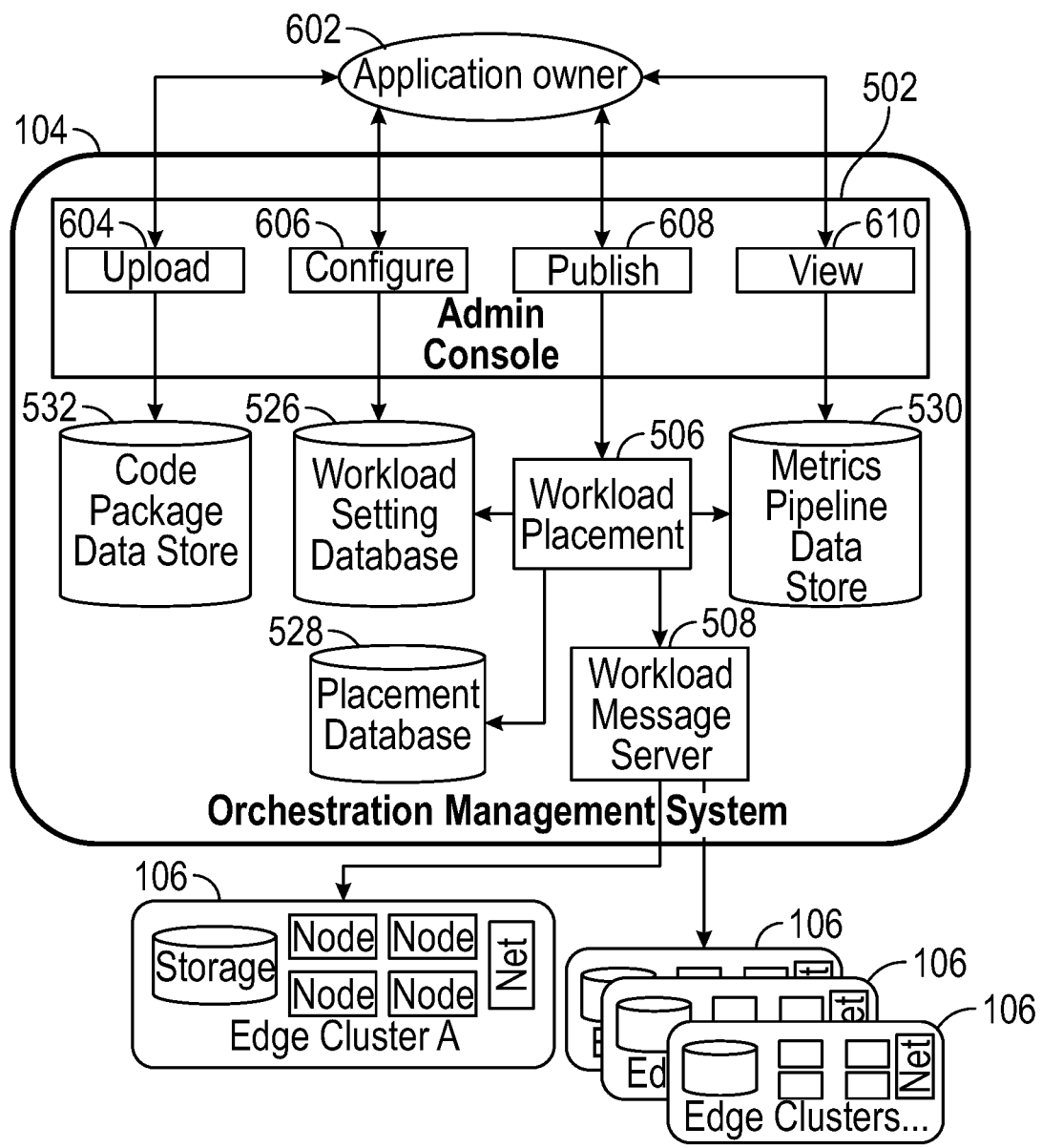
FIG. 6 is an illustrative simplified drawing showing certain message flow details between an administrative UI module and certain components of the orchestration manager of FIG. 5 and showing certain message flow details between those certain components of the orchestration manager and multiple edge data centers.

Each edge 106 includes an edge message client 533 coupled to communicate over the communication network with the workload message server 508. An edge workload manager 534 retrieves workload code and manages configuration of workload code to run on the edge and also manages configuration of edge resources to operate the workload code. A metrics collector 536 at each edge 106 is coupled to provide edge system and workload performance, status and health information over the communication network to the metrics pipeline manager 521, which stores the collected information in the metrics pipeline database 530 stored in memory storage device media at the orchestration manager 104. Code packages 538 of one or more tenant workloads are placed and operative at each edge 106 that is in active use. A network data path and ingress controller 540 at each edge 106 provides communication over the communication network between one or more tenant workloads 538 and external endpoint devices 110. One or more edge cluster schedulers 542, described below, schedule the execution of code at the edge. UI Module to Specify and Mange Workload Orchestration Operations FIG. 6 is an illustrative simplified drawing showing certain message flow details between the administrative UI module 502 and certain other components of the orchestration manager 104 of FIG. 5 and showing certain message flow details between those certain components and multiple edge data centers 106. Each edge includes a storage volume, one or more nodes, and a network communication interface. The administrative UI module 502 includes an administrative user interface for a tenant application owner 602 to specify what tenant code packages to publish via a communication network accessible code package data store 532, and optionally specify settings in a settings database 526 that determine how and where a tenant application code should be run on the edges. Example settings include information such as, application hostname, network settings, resource controls such as how much CPU or storage may be used by the application on one or more edges, and factors such as minimum and maximum number of tenant application instances to deploy, application owner preferences, which may include secrets, workload pre-positioning information and workload runtime configuration updates. The administrative UI module 502 saves these settings in the workload settings data store 526 accessible to the workload placement manager 506. Different example user interface (UI) implementations include command line interface (CLI), application programmatic interface (API) or by publishing the workload to the administrative UI module user interface. An application owner, therefore, can access an example UI module 502 remotely over a network such as the Internet, for example.

Some example user interface components involved in managing a workload include:

Upload UI component 604: The upload UI component is configured to receive application owner input over the communication network to upload workloads to the orchestration manager 104 for configuration and publication to one or more edges 106. Uploaded workloads are stored as code packages in the code package data store 532, for example. In some cases, an uploaded code package is provided by reference, such as the name of the code package location in an external registry or data storage service, which may be operated by the customer or by a third party, such as DockerHub, GitHub, GitLab, Amazon S3, for example.

Configure UI component 606: The configure UI component is configured to receive application owner input over the communication network to create a configuration specification for a workload. Configuration parameters within the configuration specification include information, such as geographic location preferences and latency preferences, and such as program code and edge resource requirements. An example configure UI receives application owner configuration settings input to specify and adjust what tenant application code to publish, and optionally to specify settings that describe how and where the tenant application should be run on the edges, any relevant application hostname or network settings, resource controls for the application, and factors that can control costs of running the application. An example configure UI component 606 provides settings input to the workload settings database 526, which is used by the workload placement manager to (1) select the edge clusters where a workload is to be placed, and (2) determine the configuration settings to control the behavior of the edge nodes in those clusters, such that a published code package operates according to an application owner's configuration specification.

Publish UI component 608: The publish UI component is configured to receive application owner input over the communication network to publish the workloads to the edges 106. During publication, configuration preferences are used to identify one or more initial locations to publish to. Over time, the workload placement manager 506 uses the configuration preferences to refine the locations to publish to based upon factors such as actual latency and actual node and resource availability in each location.

View UI component 610: The view UI component is configured to receive application owner input over the communication network to view progress of a workload's publication, and the runtime status. An example view UI component 610 receives application owner requests over the network to view status of the workload during its operation including an indication of latency and traffic information from external endpoints. An example view UI component 610 provides application log and status metrics for individual edge data centers 106 for real-time monitoring, historical behavior reporting, and external endpoint traffic information of tenant applications, and to interact with a debug facility to diagnose behavior of application code running in an edge cluster, for example.

Thus, the administrative UI module 502 as depicted relays user requests to upload a container by publishing the application container to the code package data store 532 of the orchestration manager 104. Configuration settings requested by an application owner are published into an workload settings database 526, which is used by the workload placement manager 506 to identify the specific configuration settings to direct each cluster scheduler in each selected edge how to configure the cluster such that a published code package will be correctly operable. Upon the publish instruction from the application owner, the administrative UI module 502 relays a publish request to the workload placement component 506, which identifies specific edge clusters and begins deployment as detailed further below.

Edge Resource Allocation Manager

Referring again to FIG. 5, the resource allocation manager 504 tracks edge resources such as CPU, memory, network, disk and memory utilization, availability and capacity, for example. An example edge resource allocation manager 504 accesses metrics information provided or published through a set of data pipelines 530 received from the multiple edges 106, performs analytics to identify workload, node, and edge status, such as "ready", "unable to connect", "CPU utilization X % of capacity", for example. An example edge resource allocation manager 504 provides status notifications to the workload placement manager 506. In response to requests from the workload placement manager 506, an example edge resource allocation manager 504 retrieves and forwards analytics and metrics information from the set of data pipelines 530. The pipeline keeps a running status over time of edge cluster resource utilization and health An example edge resource allocation manager 504 provides one or more of the following services:
  Maintain inventory information of edge capacity on a per-node basis, including the hardware capabilities of each node. Examples of hardware capabilities include number of compute processors, amount of random-access memory (RAM), presence or absence of graphical processing units (GPU) or other customer hardware, and network interface details.
  Provide aggregate workload and edge inventory and resource utilization information to the administrative UI module interface(s), for application administrators and service providers to view; and to the workload placement system, for automated placement decision making.
  Maintain running snapshots of endpoint activity for all workloads deployed across all edges under management, including endpoint activity over time in terms of request messages.
  Convert, as necessary, from provider-specific metric information to a uniform representation based upon the metrics reported by native edge nodes and software systems.
  In some examples, the edge resource allocation manager runs one or more data analysis algorithms to estimate future demand based upon past traffic.

Workload Placement Manager

Referring to FIG. 5, the workload placement manager 506 places tenant workloads at edges 106 based upon tenant application owner specified constraints and edge data center constraints, such as application location and latency preferences, resource availability and capacity within each edge, estimated cost of running the code in each edge in terms of CPU demand and storage utilization, for example, and external endpoint demand expectations, which are inferred from past external endpoint behavior or provided by a tenant application owner.

While some tenant workloads receive endpoint requests, directed according to the traffic steering rules explained below, other example tenant workloads receive no inbound requests: instead, they generate outbound messages, or they may perform some computation or serve a local data storage function without receiving inbound messages, or sending messages out of the cluster. The former, which receive endpoint traffic, are referred to as ingress workloads; the latter as non-ingress workloads.

An example workload placement manager 506 provides one or more of the following services:
  Receive commands to perform workload related events, such as publish, upgrade, and delete, from the administrative UI (the administrative module). The administrative UI module 502 provides an option for workload owners to provides location hints for workloads to assist placement, e.g., regions where they expect endpoints/devices to be present, or locations where a non-ingress workload should run.
  Determine edges 106 at which to place tenant applications, based upon criteria supplied by a tenant application owner, for example. An example workload placement system uses one or more from a set of defined placement strategies to allow application placement flexibility for application and platform owners. Some criteria that an example workload placement system uses to determine suitable locations include:
    Application location requirement: for tenant applications that need to run in certain geographies or must not run in certain other geographies.
    Endpoint to edge latency preferences: for tenant ingress workloads that have a specified preferred maximum round trip time between endpoint and edge to optimize interactive application performance.
    Resource availability and capacity within each edge: adjust what workloads run in which edge to avoid edges from becoming, or remaining, overloaded. To achieve tenant specified performance requirements, some workload placements are rescheduled to other edges, or in some examples, to resources within an edge are expanded by bringing new instances compute resources (nodes), or storage resources into an edge.

Estimated cost of running the workload code in each edge: certain edges typically have higher operational cost due to local resource cost or other market economic factors, for example. Some tenant application owners may value a particular edge, for example for its geographic location or network connectivity, and be willing to pay more for use of that edge location. Another tenant application owner may not be willing to pay the extra cost for the edge.

Endpoint demand expectations: a given workload may experience similar behavior each day or week. The workload placement manager may utilize this predicted behavior information, which may be made available by the resource allocation manager, to control placement of workloads such that they are best prepared to meet variations in demand.

Communicate a set of edges for a given workload to the workload command message server 508, to initiate deployment of that workload's code to the intended edges, based upon the workload placement determination logic.

Periodically, monitor edge metrics, at an interval from ten seconds up to two minutes, for example, such as, traffic, load in terms of CPU utilization or network bandwidth, for example, and application health or availability, to adjust placement decisions.

In some example workload placement managers, a notification is received from the edge resource allocation manager to indicate detection of an exceptional condition, and that the workload placement manager should compute a workload placement update in response to the detected condition.

Once a workload is placed successfully in some set of edges, as measured by receipt of a "ready indication" from the command message server 508, the workload placement manager instructs the traffic steering manager to send traffic into the edges in which said workload is running and ready. An example workload placement manager 506 waits until a certain number or proportion of edges are placed before invoking traffic steering. Another example workload placement manager 506 invokes traffic steering to direct traffic immediately upon receipt of a ready indication from each edge.

An example workload placement manager 506 sometimes places workloads more broadly than needed, based upon an expectation of initial traffic demand, in order to provide improved performance and accommodate load spikes. This model can lead to higher costs along with higher performance since the system can react more quickly to a load spike if a code package is already running at an edge where increased workload capacity is required. An alternative example workload placement manager 506 places workloads in fewer locations and scales more slowly, resulting in reduced cost but slower reaction to load spikes. A tenant application owner can select between placement of a workload at a larger or smaller number of locations, for example.

Metrics Pipeline Manager

Figure 7:
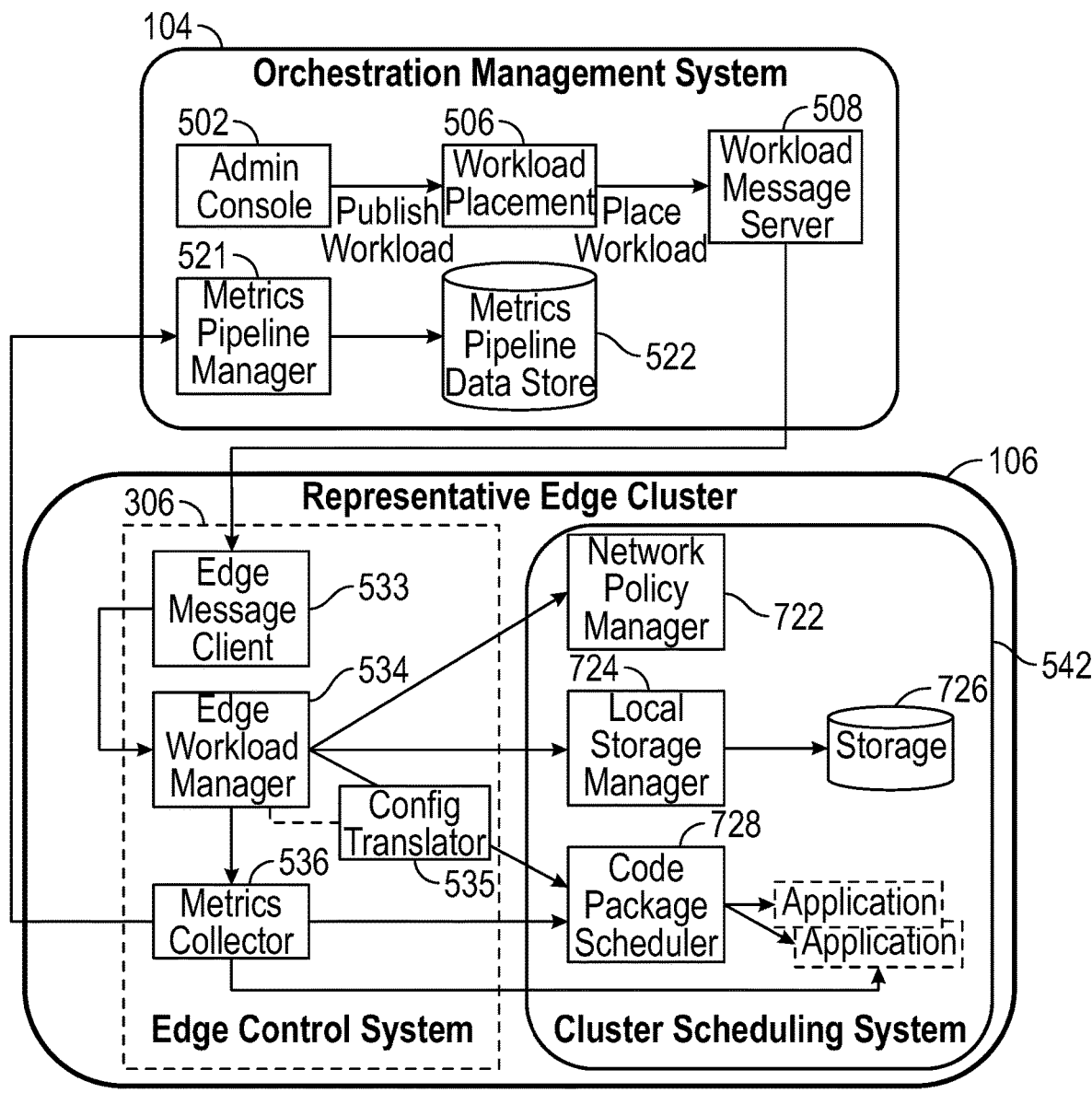
FIG. 7 is an illustrative simplified drawing of a portion of the orchestration manager and a portion of an example edge of FIG. 5 showing certain message flow details during an example workload publish process that results in placement of a tenant workload at the example edge.

Referring to FIG. 5 and FIG. 7, the metrics pipeline manager 521 receives metrics sent by one or more metrics collector 536 instances in one or more edge clusters. The metrics pipeline manager 521 stores the metrics as they arrive into a metrics pipeline data store 522, where they are subsequently used by the workload placement manager 506 to make orchestration placement and adjustment decisions using, for example, the health of applications and nodes within an edge cluster of a metrics collector instance 536, and the capacity and utilization of node resources within each cluster, for example. The metrics pipeline data store 522 holds the collected metrics and provides access functions for components of the orchestration management system. an example orchestration manager 104 includes a separate network connection between the metrics collector 536 and the pipeline manager 521, distinct from the connection between the workload message server 508 and the edge message client 533.

Traffic Steering Manager

Referring to FIG. 5, the traffic steering manager 510 directs external endpoints 110 to the most appropriate edge at which to access a given tenant workload. The traffic steering manager 510 receives a request from an external endpoint to access a workload, and in response to the request, the traffic steering manager 510 selects an edge 106 hosting the requested workload to service the request based upon one or more of multiple factors including geographic location of the edge, tenant-specified latency preferences, resource availability and capacity within each edge, estimated cost of running the code in each edge, and traffic demand expectations.

In an example traffic steering manager 510, traffic steering target information includes one or more IP addresses. An example traffic steering manager 510 is configured to include a name resolution service implemented using a Domain Name System (DNS) 512. Another example traffic steering manager 510 selects an edge using information within the orchestration manager, which collects information indicative of geographic locations of edges and external endpoints and indicative of network communication latency.

An example traffic steering manager 510 takes into account certain parameters that the workload placement manager 506 also considers. This is useful in certain cases where the traffic steering manager 510 can make a decision more quickly than the workload placement manager 506, which may need to cause workloads to move from location to location. It will be appreciated that the traffic steering manager 510 and workload placement manager 506 work in conjunction, with a quicker traffic steering decision preceding an adjustment to placement of that workload across other data center clusters, based upon the metrics available to workload placement manager 506 at that time.

Note that only ingress workloads receive traffic steering; a non-ingress workload does not need a mapping from hostname to steering targets.

An example traffic steering manager 510 provides one or more of the following services:

Receive an indication from a workload placement manager 506 of the set of edges 106 that should be steered for a given workload.

Each steered workload has a name with which external endpoints identify the workload, for example a hostname.

Each edge has a set of steering target identifiers to which external endpoints are steered, for example one or more IP addresses.

Publish an association between a tenant workload name (e.g., hostname) and edge steering target identifier(s), to a name resolution service. The name resolution service provides appropriate steering target information to a requesting external endpoint in response to a request received from the external endpoint that indicates an associated hostname.

Workload Message Server

Referring to FIG. 5, the workload message server 508 is responsible for passing messages between the workload placement manager 104 and the edge clusters 106. For example, the workload message server 508 passes messages over the communication network between one or more components of the orchestration manager 104 and the edge clusters 106 controlled by the orchestration manager 104. In an example network workload management system 102, there are multiple orchestration managers 104, each with a distinct set of edges 106 under its control. In an example orchestration manager 104, the edges establish a network connection with a workload message server 508 to exchange messages with the orchestration manager 104 after communicating a secure identity of the edge 106 in order to ensure the edge is authorized to participate in the network workload management system.

In the case of a publish request from an application owner, the workload placement manager 506 sends a request to the message server 508 indicating the set of edges 106 intended to run a given tenant workload. The message server 508 instructs each indicated edges 106 to run the workload (via its corresponding edge message client 533). The message server 508 awaits a ready indication from each edge message client 533 if and when a workload enters the ready state, which the workload message server 508 passes a message to the workload placement manager 506 to trigger the traffic steering module 510 to steer traffic to the indicated edges.

An example workload message server 508 provides one or more of the following services:

- Hold connections to one or more edge message client instances 533 in one or more edges 106, in order to pass messages over a communication network back and forth between the orchestration manager 104 and the edges 106. Each edge 106 includes one or more edge message client instances 533; the orchestration manager 104 includes a plurality of workload message server 508 instances running, for reliability and performance.
- Maintain a queue of commands indicating actions to take and to execute actions until there are no more commands in the queue. Some commands involve sending request messages over the workload placement network 108 to one or more edge message clients 533 that request action by components of one or more edges 106. Some commands involve receiving request messages over the network 108 from edge network clients 533 to request action by one or more components of the orchestration manager 104. The actions are added to the queue by the workload placement manager 506 or by other components in orchestration manager 104, and also by the edge message clients 533 to which the workload message servers are coupled.
- Process a queued request from a workload placement manager 506 to start, stop, or remove a workload in a set of indicated edges. In response to such a work item the workload message server 508 passes a message to each connected edge message client 533 instructing it to start, stop, or remove a workload as requested.
- Receive status updates from respective edge message clients 533 to track progress of a tenant workload's loading and execution. When a status update indicates a workload has become ready, workload message server 508 relays the message immediately to a workload placement manager 506 for possible placement and steering adjustment.
- Detect failure of an edge through failure of the communication channel(s) used by that edge 106. In an example workload message server 508, if a plurality of channels are in use all must fail, and not be re-initiated within a timeout interval of for example 30 seconds to three minutes, to declare the edge as failed. The detection timeout interval should be short enough to allow responsive behavior, but this long enough to avoid transient data loss and false positive failure signals.

Edge Message Client

Referring to FIG. 5, the edge message client 533 maintains a connection with the workload message server 508 through which it receives control instructions and transmits workload status information back to the message server 508. The edge message client 533 passes messages between components of the edge 106 and the workload message server 508. For example, the edge message client 533 sends individual workload health information such as a ready (or healthy) indication from a tenant workload(s) 538, and overall edge status information. The health and status information generally is workload specific, and distinct from the information within the metrics pipeline 530, which typically carries far more varied detailed information, including system status as well as varied workload status and operation messages. A purpose of the ready/healthy indication is to propagate this status as quickly as possible to allow placement and steering to take action as soon as a workload is ready. The workload placement manager 506 uses this information in the process of making placement and steering decisions as described above.

In an example network workload management system 102, each edge runs multiple edge message client instances 533 in order to provide high reliability and availability to the orchestration manager 104. Each edge message client instance 533 connects over the communication network to at least one workload message server 508, of which there may be a plurality running as part of the orchestration manager 104.

An example edge message client 533 provides one or more of the following services:

- Hold a communication network connection to a workload message server 508, to pass messages back and forth between an edge 106 and the orchestration manager 104.
- Receive control messages from workload message server 508 containing instructions to relay to other edge components, such as a request to start, stop, or remove a workload from the edge; such messages are directed to the edge workload manager, to control a tenant workload. Other messages are sent to a cluster control system, such scheduling commands directed to a cluster node scheduling system; such messages alter cluster configuration settings.
- Send status updates about workloads to the workload message server 508, for example when a workload registers as healthy and thus ready to serve endpoint traffic. If a workload fails to start after a certain time interval, typically 30 seconds to five minutes in duration, for example, the workload placement system elects to start that workload in a different edge location.

Edge Workload Manager

Referring to FIG. 5, the edge workload manager 534 retrieves a workload configuration specification identifying code packages intended to run in its edge, as determined by the orchestration manager 104 as relayed through the edge message client 533. The edge workload manager 534 extracts tenant workloads and cluster-specific configuration instructions from the code packages, which are retrieved from a database or the code package data store 532 via the edge message client 533, as directed by the workload message server 508.

An example edge workload manager 534 controls and monitors the behavior of a cluster scheduling system, explained below, which manages code packages (e.g., containers and/or virtual machines) running on the nodes of a cluster of nodes within an edge. The edge workload manager 534 causes the cluster scheduling system to schedule a workload code on one or more nodes within the cluster, per configuration instructions provided consistent with syntax and structure of the cluster scheduling system. An example workload configuration specification includes settings to control how much of each resource a container (or virtual machine) is permitted to use. For example, a container may be permitted to use one full CPU, four gigabytes of local memory, one hundred gigabytes of cluster-wide persistent storage, and so forth.

An example function of the edge workload manager 534, as illustrated further in FIG. 7, is to set up the edge cluster to run the intended application containers. This includes: configuring correct network policy to provide isolation of one tenant from other tenants using the cluster; configuring local persistent storage across the cluster, such as with a distributed file system, so container state is maintained when containers restart; a container scheduler component that starts application containers on appropriate nodes in the cluster, monitors their health, stops them if so instructed, and restarts them in case they terminate unexpectedly.

An example edge workload manager 534 includes a configuration translator 535 to translate application workload preferences, as expressed in a workload configuration specification input by an application owner via the administrative UI module 502, into runtime configuration settings for a corresponding cluster scheduler 542. In an example network workload management system 102, different example edges 106 can be configured with different resources, such as different numbers of processors or processors having different speeds and/or different memory storage volumes, for example. Moreover, different edges can be managed by different organizations such as different internet service providers, or even an application owner itself, which configure nodes differently from one another. An application owner can provide input to an example UI module 502 to specify edge performance preferences in abstract terms such as total processing throughput or storage processing capacity, for example. The configuration translator 535 translates an abstracted performance preference associated with a workload to runtime configuration settings suitable for a scheduler instance 542 at an edge to configure edge resources to meet the preferences.

An example edge workload manager 534 provides one or more of the following services:

Fetch code packages, upon request relayed by an edge message client 533, from the code package data store 532 where they are stored, into edge local storage. Code packages are stored at one or more of the orchestration manager 104, an application owner storage service (not shown) or a storage service accessible to the administrative UI module 502, for example.

Extract the configuration instructions and the code from the workload. Code can be supplied as binary executables, virtual machines images, or containers.

Convert the configuration and code, if necessary, into a format that can be processed by the cluster scheduler of the edge.

Instruct a cluster scheduling system 542 to execute the workload within an edge, according to the configuration specification associated with the workload.

Report cluster scheduler issues and events such as workload launch or failure, for example, back to the orchestration manager 104 via the edge message client 533.

Edge Metrics Collector Referring to FIG. 5, the metrics collector 536 extracts and stores metrics from the nodes running in a node cluster at an edge 106, and from the workloads 538 running on those nodes. In an example metrics collector 536, the metrics are held in an in-memory database within the edge 106; in another example metrics collector 536, the metrics are written to local disk storage. The metrics collector 536 also sends a subset of the metrics collected to the edge resource allocation manager 504 of the orchestration manager 104 for storage of the data and to assist in decisions about system overload situations, for example. The subset of metrics sent to the orchestration manager 104 is determined by configuration settings of the metrics collector 536.

An example metrics collector 536 provides one or more of the following services:

Fetch status, performance and health information from system metrics interfaces, for example to measure CPU and disk I/O system utilization during prescribed time intervals, such as every five seconds.

Fetch application status, performance and health information from applications running in an edge's node cluster, for example to retrieve application-specific values, and to assess a workload's health and ready status information.

Aggregate gathered metrics according to data reduction configuration settings, for example by eliminating certain data values that are not necessary for the orchestration manager 104 or computing running average or min/max values for a greater interval than the measurement interval.

Report the gathered metrics periodically, for example every 10 seconds to two minutes, to a metrics pipeline 530 within the orchestration management system 104. Timely delivery of metric information is useful so the workload placement manager 506 can react quickly to changes in load or endpoint message patterns. In this context "pipeline" refers to the metrics flowing continuously over time from each cluster 106 to the orchestration manager 104, in support of the continuous process of evaluating metrics to update workload placement and traffic steering decisions.

The metrics collector 536 stores collected metrics from each edge cluster in a metrics pipeline time series data store (TS DB) for use by modules of the orchestration manager 104 that need to access measurements of edge clusters and their nodes.

Edge Network Data Path and Ingress Controller

Referring to FIG. 5, the network data path components manage the delivery of external endpoint messages to tenant workloads at an edge. A network ingress controller 540 manages the in-cluster network isolation and traffic shaping. The components comprise an IP layer 4 packet routing module, which directs IP packets; and an optional layer 7 application message routing module, for example using the HTTP protocol.

Network isolation refers to creation of separate network address spaces within the edge cluster such that the tenant workloads in one tenant namespace cannot see, modify, or interfere with those of another tenant namespace. A network ingress controller 540 sets up these address spaces as and when workloads are installed, as directed by the edge workload manager 534.

The ingress controller 540 further programs rules into an edge operating system such that tenant workloads and their namespaces cannot exceed a configured amount of network bandwidth.

In the case of a non-ingress workload, no endpoint messages will be directed to it, however it may still receive messages from other workloads in the same namespace within the edge cluster. It therefore still benefits from the network isolation, and its outbound messages are limited by the traffic shaping.

In an example edge 106, the network data path includes a layer 4 proxy server, which receives inbound messages as TCP connections or UDP packets and directs them to the appropriate service within the cluster to handle the message. In some cases, this is a tenant application workload; in other cases, the layer 4 proxy directs messages to a layer 7 request processor, such as an API/micro-service router, which will further direct messages to code containers and their workloads within the edge, or to a server outside the edge location, if desired so directed by the application owner, and configured by the orchestration manager.

API/micro-service routing can improve end user performance through termination of network (TCP) and security (TLS) connections nearby the end user, even if service is provided elsewhere.

An example network data path and ingress controller 540 provides one or more of the following services:

- Listen for inbound request messages from endpoints requiring service from tenant workloads. This is a typical function of a layer 4 proxy service.
- Establish and maintain connections with zero or more endpoints as may come and go over time.
- Measure network latency if possible from the endpoint to the cluster proxy and report that information via a metrics pipeline and/or a log file to the orchestration manager.
- Identify the intended tenant workload requested by the endpoint, identify if that workload is currently permitted to be accessed, and available to receive the message.
  - If the inbound request message identifies a valid workload then the network data path component forwards the message to the workload, which may be a layer 7 API/micro-service router or tenant code directly.
  - If the request message is not valid the connection may simply be dropped, the request may be served with an error response and then closed, or the request may be forwarded to another service, such as in another edge data center location, to attempt to service the request, depending upon the type of message.
- Manage message traffic from each endpoint to its respective workload until one or the other terminates the connection and provide information about established and completed connections to the metrics pipeline.

Edge Cluster Scheduler

Referring to FIG. 5, the cluster scheduler 542 manages the scheduling of code to run on a cluster of machines at an edge. The edge cluster scheduler 542 schedules containers, virtual machines, or bare executables, depending upon how the workload code is packaged. For purpose of this description we focus on one example embodiment of a cluster scheduler that schedules containers to run on nodes. An example cluster scheduler 542 provides services as described above with reference to FIG. 4.

Workload Management Flow

FIG. 7 is an illustrative simplified drawing of a portion of the orchestration manager 104 and a portion of an example edge 106 of FIG. 5 showing certain message flow details during an example workload publish process that results in placement of a tenant workload at the example edge 106. The publish UI component 606 of the UI module 502 shown in FIG. 6, receives one or more publish commands over the workload placement network 108 to initiate placement of a tenant workload. In response to a publish command to publish a tenant workload, the UI module 502 sends a publish workload request to the workload placement manager 506, conveying application owner's configuration specification stored at the application setting database 526 and identifying a corresponding code package that has been uploaded to the orchestration manager 104 and stored at the code package data store 532. An example configuration specification provides an indication as to a memory storage location of a code package to be placed at one or more edges. An example configuration specification supports the operation of the workload on each edge that is compatible with the tenant application's requirements. For example, a workload that requires a specialized component, such as a graphical processing unit (GPU), is only compatible with an edge that includes GPU components. The workload placement manager 506 determines one or more edges at which to place workload based upon a configuration specification associated with the workload that is to be placed and current network status, as described below with reference to FIGS. 9A-9D. The workload placement manager 506 sends placement requests, which indicate the one or more edges at which to place instances of the workload together with the configuration specification, to the workload message server 508. To load the workload to selected edges, the workload message server 508 sends workload placement commands over the workload placement network 108 to edge message clients 533 at the one or more edges 106 at which a workload is to be placed.

The workload message server 508 is configured to receive the placement request from workload placement manager 506 and to send a corresponding message to the edge message client 533 of each edge of an initial set of edges identified by the workload placement manager 506, instructing the edge message client 533 to download the tenant workload code package and a corresponding configuration specification and instructing the edge message client 533 to execute the tenant workload according to settings in the configuration specification, such as settings as to scheduling and edge resource allocation, for example. Each edge message client 533 is configured to receive one or more messages to place and execute the workload from workload message server 508, to convey the request to a corresponding edge workload manager 534, and to send an acknowledge message to the workload command message server 508 to acknowledge the initiation of the tenant workload. The edge workload manager 534 at each edge receives a message to run the tenant workload and communicates with a corresponding cluster scheduling system instance 542 to initiate execution of the workload. In particular, the edge workload manager 534 coordinates the downloading of the workload code package; configuring the network address space at the edge for the tenant, if necessary (e.g., if this is the first workload in the namespace); configuring local persistent storage across the cluster, such as with a distributed file system, so code package state is maintained when code packages restart; configuring the layer 7 API/micro-service routing service, if not already running in the namespace; and, if the prerequisite configuration settings have been made successfully, instructing the edge cluster scheduling system instance 542 to schedule the workload on one or more appropriate nodes at the edge, according to the configuration specification. In case of an edge configuration failure, the edge workload manager 534 communicates the failed status back to the orchestration manager 104, via the edge message client 533 to the workload message server 508.

The example cluster scheduling system instance 542 includes a network policy manager 722 that receives namespace management requests from the edge workload manager 534 to create or remove network address blocks, which include, for example 256 distinct network IP addresses, for one or more workloads within a tenant namespace, on one or more nodes as explained below with reference to FIG. 8. The example cluster scheduling system instance 542 includes a local storage manager 724 that receives storage management messages from the edge workload manager 534 requesting configuration of cluster local storage volumes 726 for one or more tenant applications on one or more nodes. The example cluster scheduling system instance 524 includes one or more code package scheduler instances 728 that manage the code package life cycle for one or more tenant code packages running on one or more nodes in a node cluster at an edge, according to the configuration settings provided to it by the orchestration manager 104 and conveyed through the edge workload manager 524. An example code package life cycle includes instructions to start a code package on some node; to start a second instance of the same code package on the same or a different node; and to terminate a code package on a node. These instructions are issued by a scheduler instance 728 according to the performance, scale, and cost preferences expressed by the application owner, as interpreted and configured by the orchestration management system in order to achieve application performance across and within clusters.

As explained above with reference to FIG. 4, in an example cluster scheduling system instance 542 executes on each node to control code packages on that node, while another scheduler instance runs on one or a few nodes within the cluster to issue cluster-wide scheduling instructions. An example cluster scheduler instance starts application code packages on appropriate nodes in an edge cluster, as determined by its logic according to a corresponding configuration specification. More particularly, an example scheduler instance coordinates scheduling of node resources (e.g., CPU, storage, local network) by different code packages according to corresponding code package specifications. In other words, example schedulers cooperate to coordinate scheduling of node resources by one or more code packages according to the configuration specifications corresponding to the one or more code packages. An example scheduler instance 542 monitors the health of code packages during time intervals such as every few seconds to two minutes, for example, and reports the status and takes action as configured for that tenant workload. An example cluster scheduler is configured to restart a code package if it is observed to terminate unexpectedly. And when so instructed by the edge workload manager 534 an example scheduler instance 542 instructs application code packages to stop running within the cluster. This can be due, for example, to a global orchestration scheduling decision at the workload placement manager 506 that has determined the code package is no longer necessary in that example edge cluster for any reason, of which the cluster scheduler instance 542 does not need to be aware.

An edge metrics collector 536 monitors the one or more scheduler instances 542 and execution of application packages at edge nodes to track code package health and node resource usage and reports the health and usage information over the workload placement network 108 to one or more metrics pipeline managers 521 that manage storage the metrics pipeline data store 522. A result of interaction of the edge workload manager 534 with a cluster scheduling system instance 542 is to create edge configuration settings such that a cluster of nodes at an edge is prepared to run a given code package, and then to launch a workload with the configured resource usage settings, which includes for example, the number of code package process instances to launch initially; a maximum number of instances allowed to run concurrently within the cluster at any one time; and conditions that control the creation and deletion of instances.

The edge workload manager 534 accommodates differences across clusters by translating application owner preferences, expressed as configuration settings for each code package, into a specific cluster scheduler configuration settings tuned for a cloud provider and cluster. For example, processor speeds ordinarily vary across or even within cloud providers, so the edge workload manager 534 typically takes local processor speed into account when configuring workloads by adjusting the scheduling attributes in the configuration. In particular, for example, if an application owner requests a certain amount of processing power, an example edge workload manager 534 determines a local configuration for an edge that will express the amount of CPU allocated to the workload based upon local node and cluster capabilities. Additionally, an example edge workload manager 534 determines a local configuration for an edge based upon one or more of network topology, storage system architecture, memory speed, and presence or absence of virtual machine monitor running a container system at an edge. Each of these differences may require a distinct translation of application owner behavioral preferences. For example, an application that requires a target amount of CPU processing power and disk I/O subsystem bandwidth in order to provide an application's preferred response time may require one full CPU of a specific type running in one example cluster but may require only one-half of a CPU of a different type running in a different example cluster. And, for example, a storage subsystem in one edge may provide sufficient throughput with a given storage subsystem, while in another edge the application may require a special higher performance storage subsystem. The edge workload manager 534 produces a configuration translation matches application configuration at an edge to edge resources at the edge to accomplish application-owner specified workload performance. It will be appreciated that the workload placement manager 506 must first identify whether each destination edge can possibly accommodate the application needs prior to selecting a given location, as depicted in decision module 906 of FIG. 9A, discussed below. Edge workload manager instances 534 at edges selected to run a workload adjust configuration settings for the workload to match edge resource and performance capabilities to achieve application owner performance requirements indicated in the settings.

Each edge workload manager 534 is configured such that, once it has completed acts to initiate execution of a workload, it monitors the execution status of the workload via the edge cluster scheduling system 542 to detect when the workload starts executing and is ready to receive endpoint requests, if it is an end user facing workload. At that point, which in an example edge may be several minutes for example, the edge workload manager 534 signals to the workload placement manager 506 via the edge message client 533 and the workload message server 508 that the workload is ready. An example edge workload manager 534 is configured to determine that the workload has not started correctly, based upon at least upon one of the cluster scheduling system instance 542 indicating that the workload failed to launch or upon a long enough time interval having passed, for example five minutes, with no ready signal. The edge workload manager 534 is configured to send a failure message to the edge message client 533 in the event of a determination that a workload has failed to execute at the edge.

Each edge message client 533 is configured to send to the workload message server 508, whatever status information is provided to it by the edge workload manager 534. The workload message server 508 is configured to publish the received status information to the workload placement manager 506, which stores the status in the memory storage device that stores a placement status database 528. In the event of a workload failure, for example, the workload placement manager 506 can take action to select a different edge, for example one nearby to a failed location, to schedule the intended tenant workload.

Edge Cluster Network Policy

Figure 8:
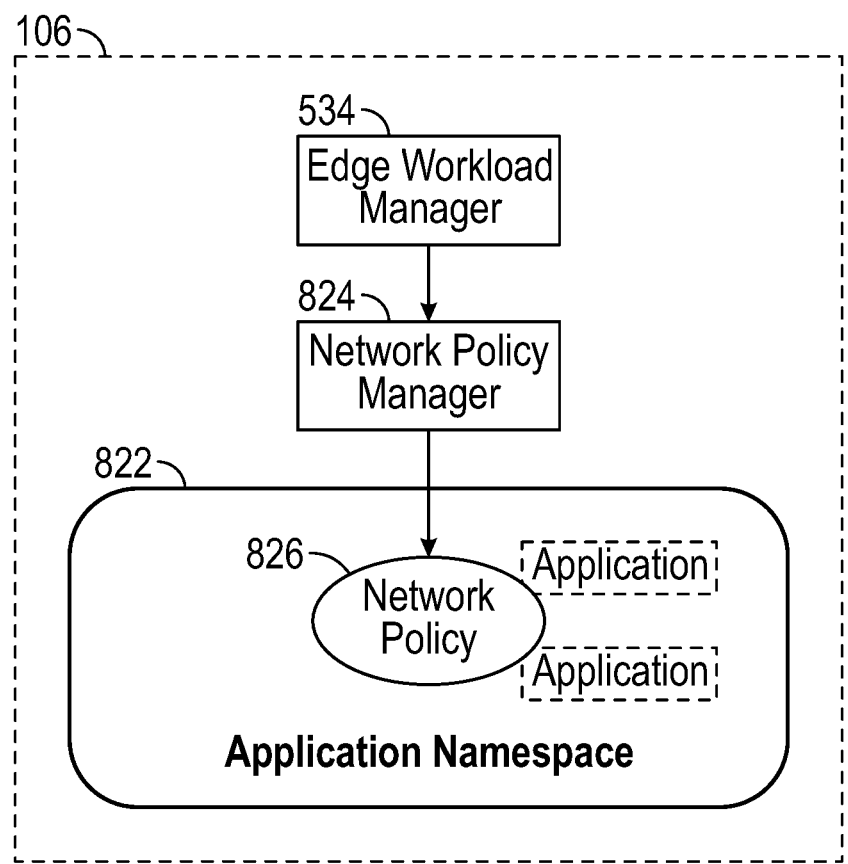
FIG. 8 is an illustrative simplified functional block diagram representing a portion of an edge showing creation of a network policy within the edge.

FIG. 8 is an illustrative simplified functional block diagram representing a portion of an edge 106 showing creation of a network policy within the edge that isolates each tenant application workload hosted by the edge from other tenant application workloads hosted by the edge. An edge workload manager 534 creates an application namespace within the edge for a tenant workload that operates within a cluster of nodes at an edge. The edge workload manager 534 instructs a network policy manager 824 to associate a network policy 826 into each of one or more tenant workload namespace 822 such as namespaces shown in illustrative FIG. 4. Each code package associated with a tenant workload namespace inherits a network policy 826 associated with the namespace associated with the workload. Different workloads are associated with different namespaces and different namespaces are associated with different network policies, for example. The network policy 826 associate with a namespace 822 restricts communication by network address blocks, for example all IPv4 addresses that contain the same first 24 bits (referred to as a "/24 CIDR block").

A purpose of the network policy 826 is to configure network rules in the underlying operating system kernel. In an example edge 106, a network policy 826 is implemented using 'iptables' rules in the Linux kernel, creating a type of firewall implementation at a low layer in the processing of network traffic within the system. Only packets that are allowed by the network policy 826 are able to pass. For example, if a first tenant application code package attempts to send a network message containing a packet to another tenant application in a different network address block the first tenant application's operating system would drop that packet.

Overview of Workload Placement

Figure 9A:
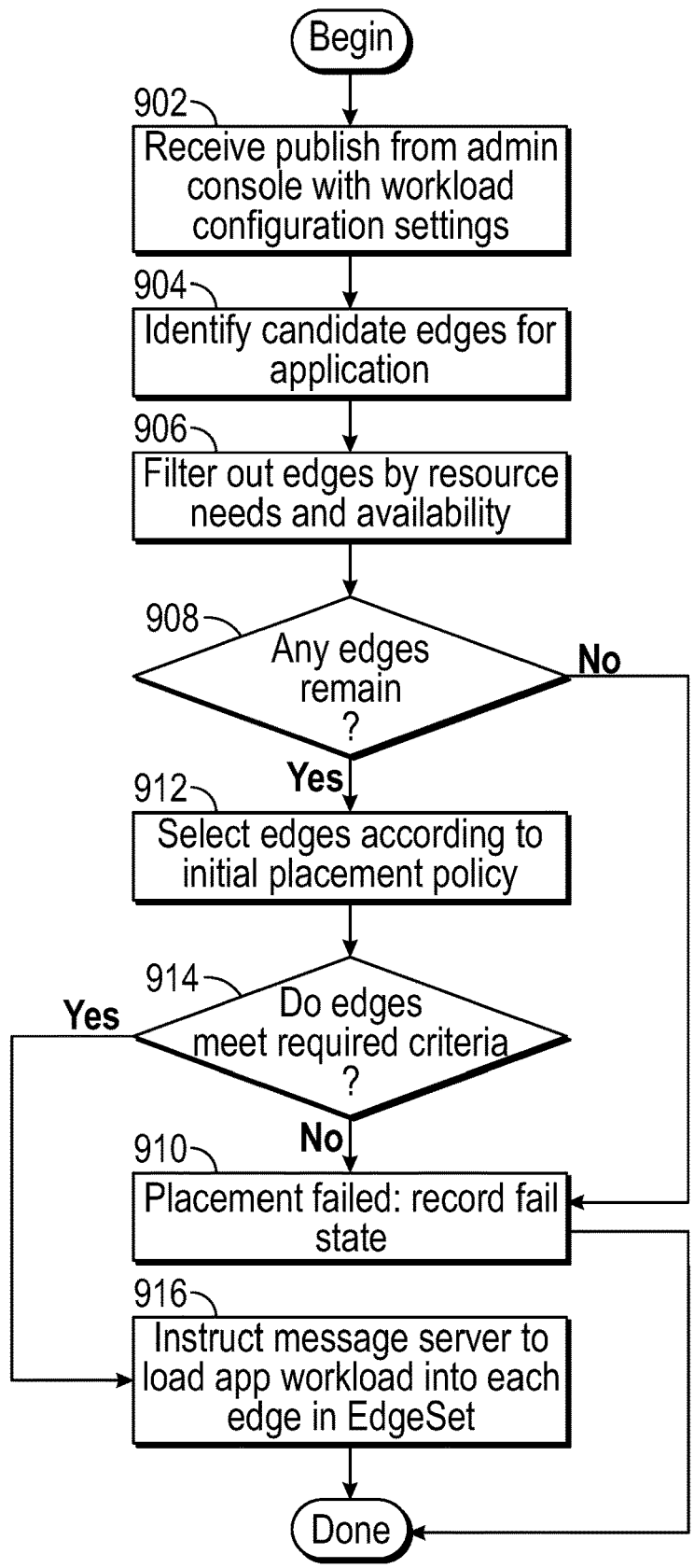
FIG. 9A is an illustrative flow diagram representing configuration of the workload placement manager of FIG. 5 to determine placement of a tenant workload at one or more edges.

FIG. 9A is an illustrative flow diagram representing configuration of the workload placement manager 506 of FIG. 5 to determine placement of a tenant workload at one or more edges 106. A placement request indicates tenant application owner preferences. Candidate edges at which to place the workload are determined based upon parameters set forth in the application owner preferences. The candidate edges are filtered based upon availability of the candidate edges. An initial placement of the workload to a set of one or more edges is made based upon the filtered set of edges.

Module 902 provides workload publish information for a tenant workload to be published, including workload parameters including a storage location of a workload code package and a configuration specification for the workload that includes a placement policy and geographic location settings. An example placement policy includes a request for a latency-sensitive "performance" placement, or specific physical locations, which correspond to specific geographic locations at which to place the workload. Examples of specific physical locations include a continent, country, city, metropolitan area, or other physical location identifier provided by a tenant workload owner, by the orchestration manager or by a provider of one or more edge locations, for example. An example latency preference specifies a target network round-trip-time (RTT) between an external endpoint and the edge. An example application owner preference (also referred to as "workload configuration specification", but distinct from the translated edge configuration specification) specifies both one or more physical locations and an RTT.

In an example placement manager 506, RTT is measured at an L4 proxy using information from a communication protocol layer, for example. Or by measuring the time between a request sent and response received for a simple query transaction between the L4 proxy and an external endpoint 110. An RTT represents an estimation of network distance, and therefore, provides a metric by which a top level orchestration can optimize the network behavior of an application executing across a plurality of edges at different locations. Module 904 determines a candidate set of edges for the tenant workload. More particularly, candidate edge locations are converted into a set of zero or more edge descriptors, referred to herein as an 'EdgeSet', by identifying the one or more edge data centers in each of the requested locations.

An example EdgeSet for a country or a metropolitan area indicated in a configuration specification, for example, includes all of the edge data centers within the country, or metropolitan area. Module 906 determines the resource needs of a workload, based upon information in the workload's configuration specification, and compares these needs to resource availability in each edge in the EdgeSet. Edges are removed from the edge set that do not have sufficient resource capacity to execute the workload. Module 906 uses information from the metrics pipeline database 530 to make a resource availability assessment. Module 906 also takes into account edge resources that have been committed for use by a different workload placement but are not yet in use for that other workload according to information obtained from the metrics pipeline 530. Decision module 908 determines whether any edges remain in the EdgeSet following the determination of edges with resource availability. In response to a determination at decision module 908 that no edges remain in the EdgeSet, then control flows to a placement failed module 910, which records a failed placement status for the workload. The recorded failed placement status is viewable at the display UI at the administrative module. An example module 910 also sends a failed placement alert message over the communication network to the workload owner if such a notification mechanism has been configured. In response to a determination at decision module 908 that edges remain in the EdgeSet, then control flows to module 912 and one or more edges remaining within the EdgeSet are the selected according to an initial placement policy process described with reference to FIG. 9B. Decision module 914 determines whether one or more edges in the filtered EdgeSet meet the initial placement policy requirements. In response to a determination at decision module 914, that no edges in the filtered EdgeSet meet initial edge placement policy requirements, control flows to module 910. In response to a determination at decision module 914, that one or more edges in the filtered EdgeSet do meet the initial edge placement policy requirements, control flows to module 916, which instructs workload message server 508 to load the workload in selected edges remaining in the filtered EdgeSet.

Initial Placement of Workload

Figure 9B:
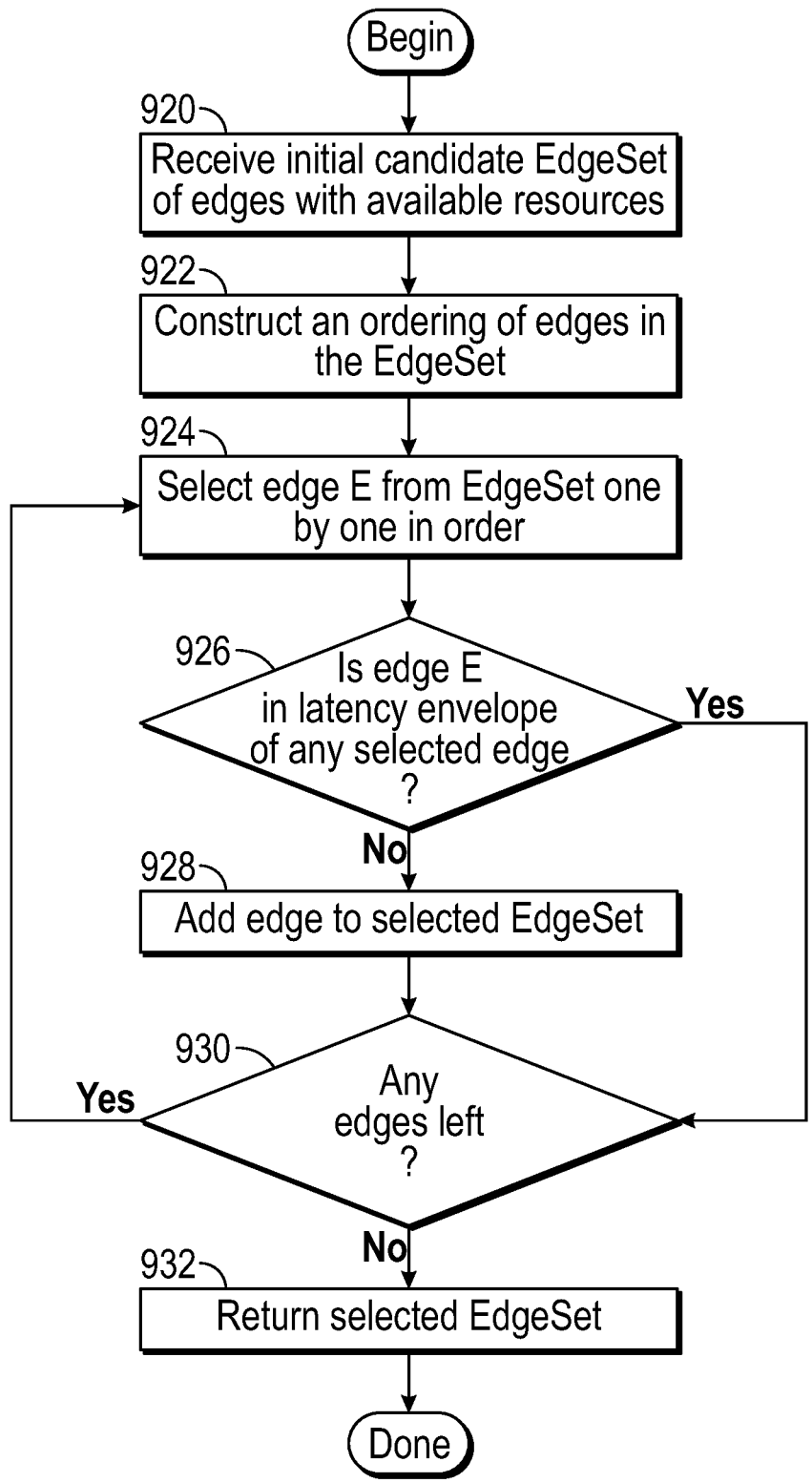
FIG. 9B is an illustrative flow diagram representing configuration of the workload placement manager of FIG. 5 to select one or more edges from a filtered EdgeSet according to an initial placement policy.

FIG. 9B is an illustrative flow diagram representing configuration of the workload placement manager 506 of FIG. 5 to select one or more edges from a filtered EdgeSet according to an initial placement policy. An example initial placement policy distributes workloads at edges so as to balance distribution of different workloads across edges locations. An example balanced distribution policy uses a 'consistent stride' to achieve balanced distribution.

As used herein, a 'consistent stride' of edges refers to a specific ordering of edges that remains stable for a given workload in the presence of addition or removal of edges. Thinking by analogy to a deck of cards, for example, a consistent stride corresponds to the same card order after a shuffle by a specific player. The card order would be different when shuffled by a different player, but again the same different order after every shuffle for that different player. A consistent stride technique delivers more stable placement decisions, in the sense that it places a workload in the same edge each time if possible. A consistent stride further reduces clustering of workloads for different tenants at an edge, as compared to a pure "nearest" calculation, which can place workloads of many tenants preferentially on a single edge location. And the consistent stride improves resource utilization in edges by ensuring they preferentially execute the same workloads as before. Consistent stride placement also tends to minimize workload overlap across edges when there are multiple edges in a metropolitan area, where overlap means having workloads of different tenants occupying the same edge locations. In case there is endpoint demand for both workloads from a given geography with multiple edge locations, it is generally better for system reliability if different tenant's workloads tend to land on different edges within a target RTT, rather than simply placing in the nearest location possible. [REF: Karger 1997]-Karger, D.; Lehman, E.; Leighton, T.; Panigrahy, R.; Levine, M.; Lewin, D. (1997). Consistent Hashing and Random Trees: Distributed Caching Protocols for Relieving Hot Spots on the World Wide Web. Proceedings of the Twenty-ninth Annual ACM Symposium on Theory of Computing. ACM Press New York, N.Y., USA. pp. 654-663. doi: 10.1145/258533.258660. [REF: U.S. Pat. No. 6,108, 703A]—Leighton, Lewin/Akamai—Global Hosting System.

More particularly, module 920 receives the filtered EdgeSet. An example received EdgeSet includes a workload identifier (workload ID) and a list of the edges contained within the filtered EdgeSet (by edge ID). Module 922 produces information to create an ordering of the EdgeSet, for example a consistent stride of edges. More particularly, in reference to the consistent stride approach, module 922 creates a list of the edge ID plus a one-way hash of the edge ID plus the workload ID together, preferably using a cryptographic hash function, such as SHA-128. Module 922 sorts the list by the hash value and records the order of the associated edge ID. The list of edge IDs in this order represent a "consistent stride of edges" for this workload. An alternative approach selects edges through another ordering criterion, such as edge ID, creation date, or other data value associated with the edge, for example.

Module 924 selects edges one by one from the filtered EdgeSet to construct an EdgeSet for initial placement.

For sequentially selected each edge of the filtered EdgeSet, decision module 926 determines whether the edge is within a latency envelope of any previously selected edge. An example module 926 defines a latency envelope in terms of a round-trip-time (RTT) service level objective (SLO). If a workload's configuration specification indicates that placement is performance-level based, then a RTT SLO parameter ordinarily is provided, for example, by a workload owner to implement a performance-level oriented placement policy. If on the other hand, a workload's configuration specification indicates that placement is based upon specifically identified locations then typically, no SLO is provided, and workload placement uses a default RTT SLO, such as a parameter provided by the orchestration manager, for example 20 milliseconds. Decision module 926 converts the RTT SLO into a distance using a rule such as a heuristic such as 'one millisecond RTT is approximately 30 miles' (or 50 kilometers), for example. The objective is to select one or a few edges at each physical location, in most cases the minimum number of edge data centers to satisfy the demand from that physical location.

If module 926 determines that a given edge of the filtered EdgeSet is within the RTT SLO of a previously selected edge, then the given edge is not selected. If the given edge of the filtered EdgeSet is not within the RTT SLO of a previously selected edge then the given edge is selected.

Module 926 implements exceptions to the above RTT-based selection rule, however. One exception (not shown) to the RTT-based rule is that even if a given edge that is within the RTT SLO of another edge, the given edge is selected if the workload configuration specification indicates a preference for redundant edge resources in one or more selected location. Another exception (not shown) to the RTT-based rule is that, even if a given edge that is within the RTT SLO of another edge, the given edge is selected if the workload configuration specification includes a load estimate provided in the configuration specification by a workload owner indicates that resource capacity is desired at a location to provide adequate end user response time. Otherwise, module 926 determines that the given edge is not added to the initial placement EdgeSet.

In response to a selection at module 926 of an edge for inclusion in the initial placement EdgeSet, control flows to module 928, which adds the selected edge to the initial placement EdgeSet. In response to an occurrence of one of a determination at decision module 926 that an edge is not to be included in the initial placement EdgeSet or to addition of a given edge to the initial placement EdgeSet at module 928, control flows to decision module 930, which determines whether there are additional edges to be evaluated in the filtered EdgeSet. In response to a determination at decision module 930 that there remain additional edges to be evaluated, control flows back to selection module 924. In response to a determination at decision module 930 that there no edges to be evaluated, control flows to module 932, which returns the selected initial placement EdgeSet.

Adjustment of Workload Placement

Figure 9C:
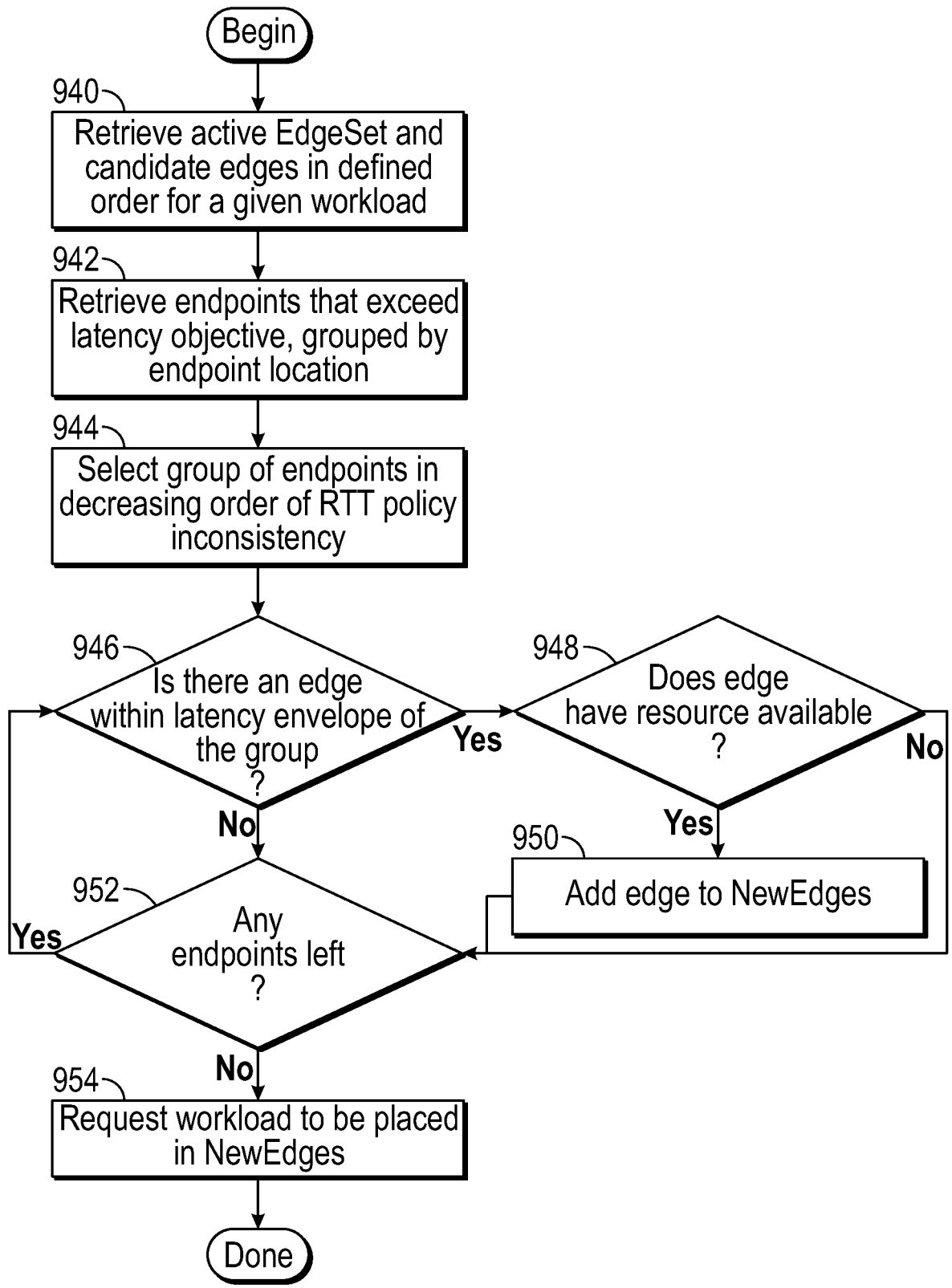
FIG. 9C is an illustrative flow diagram representing configuration of the workload placement manager of FIG. 5 to adjust workload placement based upon network latency.

FIG. 9C is an illustrative flow diagram representing configuration of the workload placement manager 506 of FIG. 5 to adjust workload placement based upon network latency. An example process according to FIG. 9C achieves workload placement refinement based upon RTT (network latency), which applies when an application owner has selected a performance-oriented policy with an RTT SLO. For example, the workload placement manager 506 may observe a group of external endpoint messages arriving at an edge 106 with a higher latency than a preferred RTT SLO. In response to such observation, the workload placement manager 506 determines whether there is a different edge with sufficient available resources to accommodate the external endpoint traffic. If so, the workload placement manager 506 adds that additional edge to an EdgeSet for the workload and requests, via the workload message server 508, placement of the workload at that additional edge. External endpoints 110 typically are grouped together by geography to reduce the total number of comparisons to be made. The geography of an external endpoint 110 is determined through information available from the external endpoint itself or based upon the external endpoint's IP address if no more precise resolution is available. When evaluating whether there is an edge within the RTT SLO of an endpoint group, the workload placement manager 506 looks through candidate edges using the consistent stride order, described with reference to FIG. 9B to achieve balanced distribution of workloads to edges.

More particularly, module 940 orders a set of active EdgeSet and candidate edges for a given tenant workload in a determined consistent stride order for the given tenant workload. Module 942 (1) observes RTT information returned by edge metrics collectors 536 at the ordered edges and (2) identifies groups of external endpoints 110 that exceed RTT policy for the given workload, where the group is comprised of external endpoints within a short geographic distance from each other according to the estimated IP location. Grouping external endpoints based upon geography reduces the total number of comparisons to be made, for example. Module 944 selects external endpoints from the endpoints exceeding the RTT SLO, retrieved in the previous step, in decreasing order of RTT SLO inconsistency. Decision module 946 determines whether an edge from the group of candidate edges for the workload is within the RTT SLO for this group of endpoints. Recall that the grouped external endpoints 110 are all within a short distance of each other.

In response to a determination at decision module 946 that a currently selected edge meets the RTT SLO, decision module 948 determines whether the currently selected edge has sufficient available resources (e.g., CPU cycles, memory storage) to accommodate the endpoint traffic. In response to a determination at decision module 948 that a currently selected edge has sufficient resource availability to serve the given workload, module 950 adds the currently selected edge to a set of edges, NewEdges. In response to a determination at decision module 948 that a currently selected edge does not have sufficient resource availability to serve the given workload, decision module 952 determines whether there are more external endpoints 110 in the group of external endpoints that have not yet been evaluated. If there are additional external endpoints to evaluate, then following decision module 952, control flows back to module 944 and a next in order group of external endpoints is selected. Also, control flows to decision module 952 in response to a determination at decision module 948 that that a currently selected edge does not have sufficient resource availability to serve the given workload. In response to a determination at decision module 952 that there are no additional edges in the group to be evaluated, control flows to module 954, which requests placement of the workload at the edges within the NewEdges set. Note that some endpoints may not be able to be served within RTT SLO as a result of this control flow, as in the case where no edge exists within the RTT SLO. Thus, the SLO is a service level objective rather than a service level agreement or assurance.

Adjustment of Workload Placement Based Upon Overload

Figure 9D:
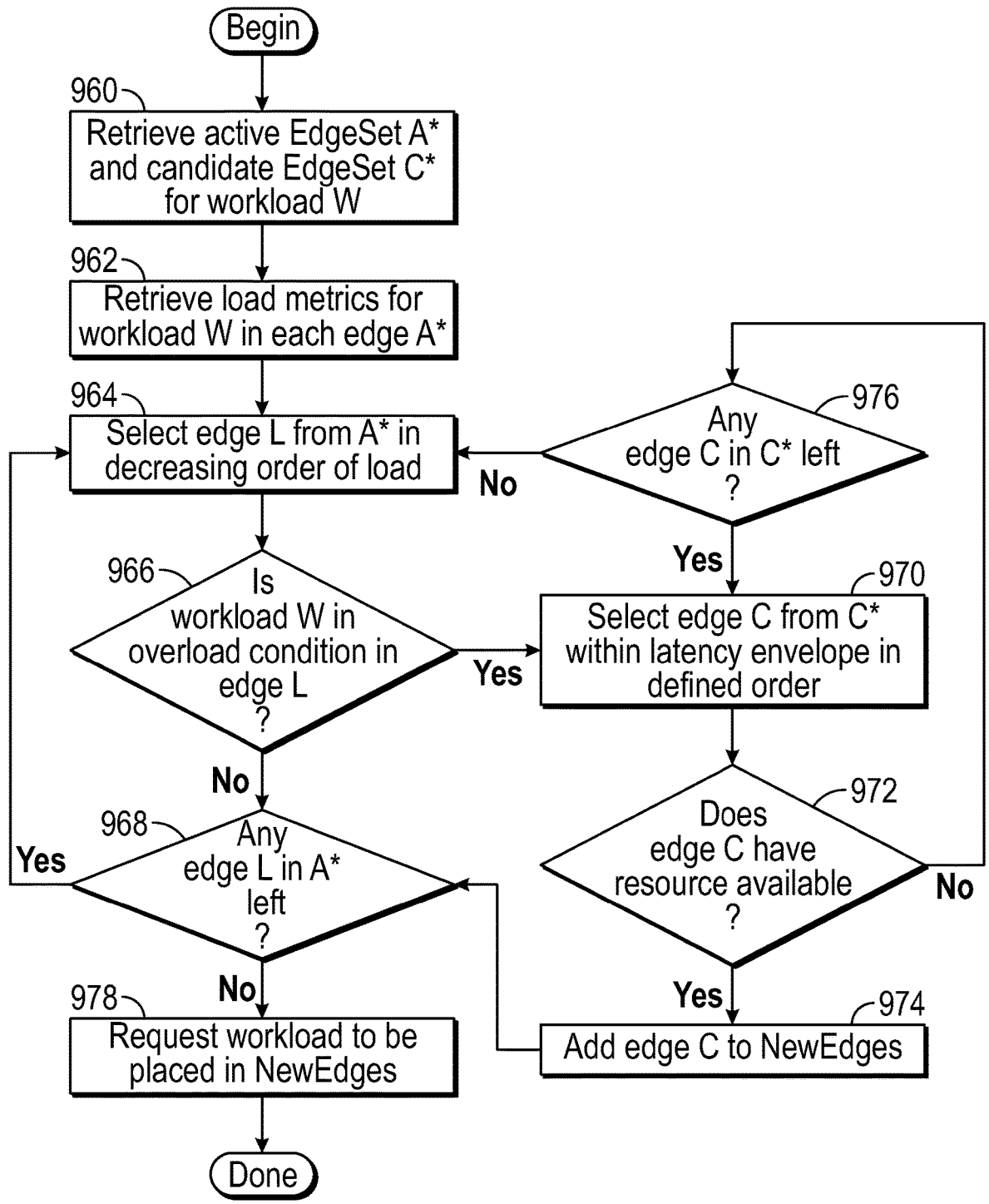
FIG. 9D is an illustrative flow diagram representing configuration of the workload placement manager of FIG. 5 to adjust workload placement based upon edge resource load.

FIG. 9D is an illustrative flow diagram representing configuration of the workload placement manager 506 of FIG. 5 to adjust workload placement based upon edge resource load. An example process according to FIG. 9D identifies edge data centers 106 that are experiencing high load condition, both for a given workload and overall for the edge resources itself. A tenant workload is in an overload condition, for example, at an edge if: (1) the workload is unable to utilize the resources requested in the configuration settings; or (2) if the workload is utilizing the full resource allotment and one or more of the resources are in persistent high-load state, such as 90% CPU utilization. In the case of overload, the workload placement manager 506 attempts to find additional edges geographically nearby to run the workload. If a tenant application owner has not specified an RTT SLO, a default value is used as described above. Again, in the expel process, edges are considered in consistent stride order to achieve balanced distribution of different workloads among edges. The workload placement manager 506 requests that workload message server 508 publish the workload to newly identified edges to be added to alleviate an edge resource overload.

More particularly, module 960 retrieves an active EdgeSet A* and a candidate EdgeSet C* for a workload W from the inventory database 522 of FIG. 5. Module 962 retrieves metrics for workload W in each edge in A* from the metrics pipeline time series database 530. Module 964 selects edges L from EdgeSet A* in decreasing order of edge load. Decision module 966 determines whether the workload W is in overload condition at edge L. It will be appreciated that different edges can have different levels of resources and that some edges are single tenant and other edges are multi-tenant. A multi-tenant location may experience resource overload for a workload due to other tenant activity, leading the workload placement manager 506 to identify a better location for one or more workloads, or the client traffic to those workloads. In response to a determination at decision module 966 that the workload W is not in an overload condition at edge L, decision module 968 determines whether there are additional edges L in A* that have not yet been evaluated. In response to a determination at decision module 968 that there are additional edges L in the active EdgeSet A* left to be evaluated control flows back to module 964, which selects a next edge L from the active edges A* for evaluation. In response to a determination at decision module 966 that the workload W is in overload condition at edge L, module 970 selects edges from C* that are within the RTT SLO of the overloaded edge, in some order, for example a consistent stride order. Decision module 972 determines whether a currently selected edge C has resources available for use by the workload W. In response to a determination at decision module 972 that a currently selected edge C has resource availability, module 974 adds the currently selected edge C to a NewEdges set. After module 974, control flows to module 968. In response to a determination at decision module 972 that a currently selected edge C does not have resource availability, module 976 determines whether there are additional edges C within C* that have not yet been evaluated. In response to a determination at decision module 976 that there are additional candidate edges to be evaluated, control flows back to module 970 for selection of a next candidate edge for evaluation. In response to a determination at decision module 976 that there are no more candidate edges to be evaluated, control flows back to module 964. In response to a determination at decision module 968 that there are no additional edges L in the active EdgeSet A* left to be evaluated control flows module 978, which requests placement of the workload at the edges within the NewEdges set.

Placement of Workload in Edges

Figure 9E:
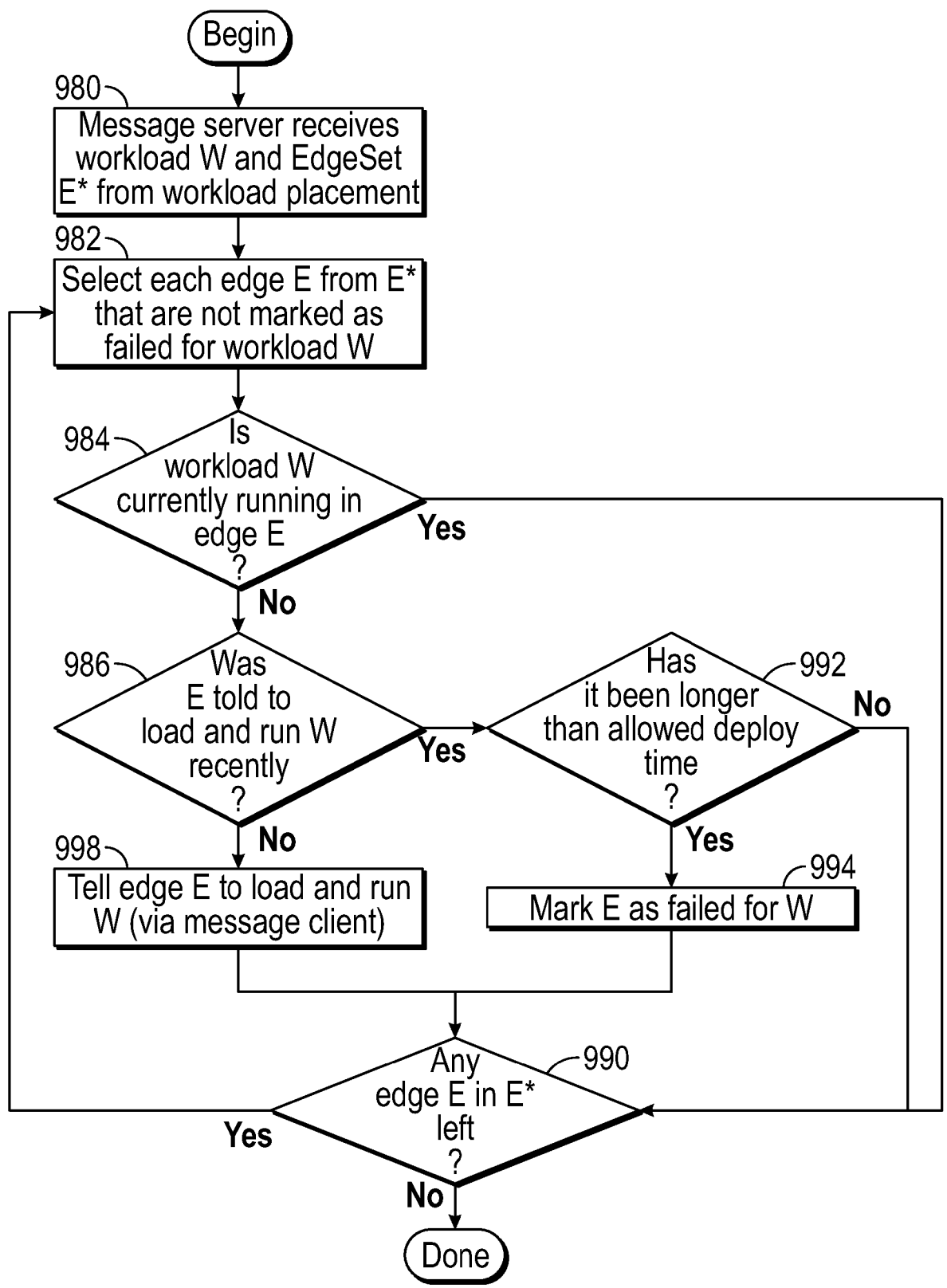
FIG. 9E is an illustrative flow diagram representing configuration of the workload command message server of FIG. 5 to control placement of workloads at edges.

FIG. 9E is an illustrative flow diagram representing configuration of the workload message server 508 of FIG. 5 to control placement of workloads at edges 106, taking into account that placement may fail for a variety of reasons. An example process according to FIG. 9E occurs in response to a place request received from the workload placement manager 506. If a workload is already running in a requested edge, no further work is required. Otherwise, the workload message server 508 checks to determine whether a start request has been sent recently and initiates a request to an edge message client 533 if not. If the workload already has been sent to that edge, and a placement completion timeout period has elapsed, such as five minutes, the edge is marked as failed for that workload. If a workload placement to an edge fails, then workload placement manager 506 takes the failed edge out of the candidate edge set for a prescribed removal time interval, for example one to five days. Future edge refinement will consider other edges further down the consistent stride order in place of the failed edge. Removal of a workload from an edge not in an EdgeSet E* is handled separately, based in part upon residual external endpoint traffic that may be arriving at a deselected edge.

More particularly, module 980 receives at the message server 508, a workload W and EdgeSet E* from the workload placement manager 506. Module 982 selects an edge E from the EdgeSet E*. Decision module 984 determines whether workload W currently is running in the currently selected edge E. In response to decision module 984 determining that workload W is not currently running in the currently selected edge E, decision module 986 determines whether the message server 508 has sent a start request to the currently selected edge E to start execution of the workload W. In response to a determination that decision module 986 has not recently sent a request to start W at the currently selected edge E, module 998 marks the currently selected edge E as selected for the workload and instructs the message server to send instruction to the message server in edge E to start the workload W, and control flows to decision module 990, which determines whether there are additional edges E within the EdgeSet E* that have not yet been evaluated. In response to a determination at decision module 990 that one or more edges within E* have not yet been evaluated, control flows back to module 982, which selects a next edge E from E*. In response to a determination at decision module 984 that the workload W currently is running in the currently selected edge E, control flows back to module 982, which selects a next edge E from E*. In response to a determination at decision module 986 that a request to start W has been sent to a currently selected edge E, decision module 992 determines whether the start request was sent longer than a prescribed placement completion timeout period allocated to deploy workload W at the currently selected edge E. In response to a determination that the time interval since the request was sent to the currently selected edge is less than prescribed placement completion timeout period, control flows back to module 982. In response to a determination that the time interval since the request was sent to the currently selected edge greater than a prescribed placement completion timeout period, module 994 marks the currently selected edge as failed for W, and control next flows to decision module 990. In response to a determination at decision module 990 that no more edges in the EdgeSet E* remain to be evaluated, the process is done. It will be appreciated that some workloads may require considerable time, several minutes in some cases, to start and achieve ready state. Thus, the example algorithm waits for a timeout period before determining the workload as failed. The timeout period has a system default value, for example five minutes, which can be extended or reduced by an application owner preference in the administrative UI.

Edge Data Path Components

Figure 10A:
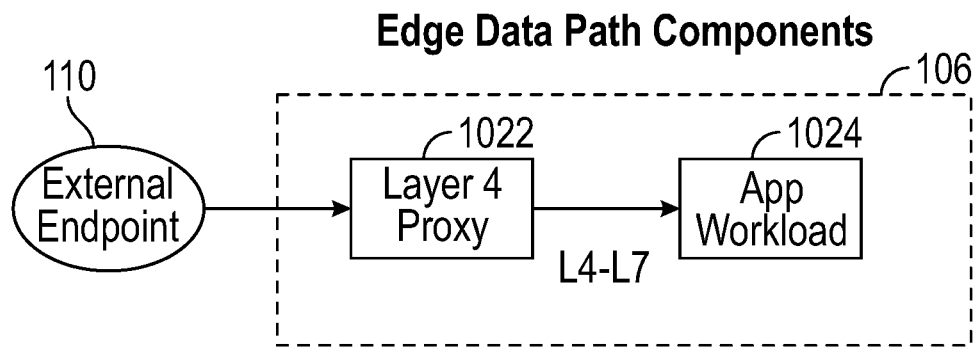
FIG. 10A is an illustrative block diagram representing a tenant workload running in an edge receiving external endpoint messages in the case of a layer 4 IP service.

FIG. 10A is an illustrative block diagram representing a tenant workload 1024 running in an edge 106 receiving external endpoint messages in the case of a layer 4 IP service. The external endpoint is directed to the edge based upon message traffic steering managed by the traffic steering manager 510 and has sent a message to the traffic steering target, for example the IP address of an edge layer 4 proxy server (L4 proxy) 1022 within an edge 106. The layer 4 proxy 1022 records information about the message, such as round-trip-time information, if available via the network protocol, and directs the message to the appropriate tenant workload instance 1024 running within the edge 106. In other words, in an edge in which multiple instances of a workload are active on different nodes, for example, the proxy selects a workload instance to handle the message based upon resource availability on the different nodes on which workload instances run. In this way the L4 proxy acts as a workload load balancer and assists in smooth upgrade of application workloads within the edge 106.

Figure 10B:
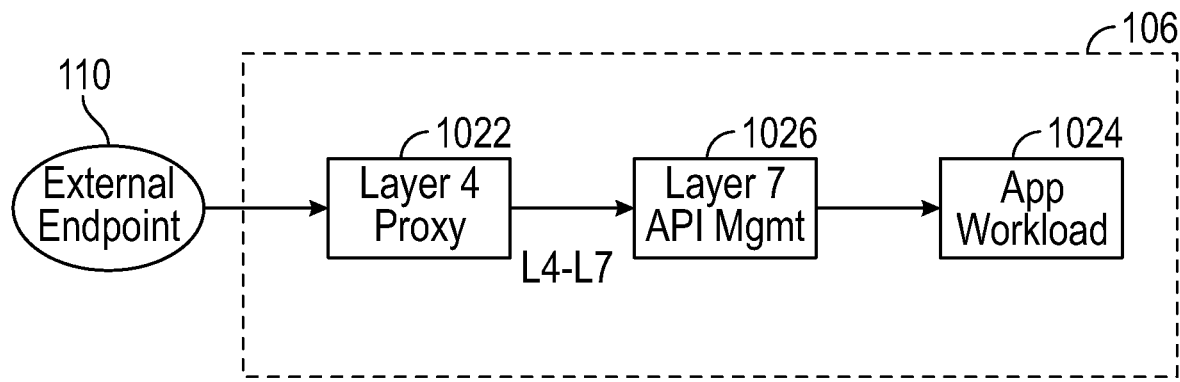
FIG. 10B is an illustrative block diagram representing network message delivery to a tenant workload running in an edge in the case of a layer 7 HTTP (or HTTPS) workload.

FIG. 10B is an illustrative block diagram representing network message delivery to a tenant workload 1024 running in an edge 106 in the case of a layer 7 HTTP (or HTTPS) workload. The external endpoint 110 is directed to the edge 106 based upon message traffic steering managed by the traffic steering manager 510 and has sent a message to the traffic steering target, for example the IP address of an edge layer 4 proxy server (L4 proxy) 1022 at the edge 106, similar to the case in FIG. 10A. The layer 4 proxy 1022 records information about the message, including round-trip-time information from the TCP protocol stack, and directs the message to a layer 7 API/micro-service routing service 1026 at the edge. The L4 proxy 1022 provides load balancing and upgrade assistance for the L7 API service, similar to that described above. The L7 API service 1026 directs requests according to configuration. The following are three different configurations, for example:

- to a workload instance within the edge, perhaps modifying the request as described in the configuration settings, where the workload instance processes the message and returns a response message as typical for an HTTP based service;
- to a server instance outside the edge, according to configuration settings that is identified based upon the received request message, where the external server instance processes the message, rather than having it processed by an application within the edge, illustrating that some messages may be routed for processing by an external entity;
- to an internal responder provided by the API/micro-service routing engine itself, where the internal responder may be configured to return an error indication or other message if no application service can or should be processed for this message.

It will be appreciated that the API/micro-service routing and policy module 1026 routes different messages to different code packages. A code package, such as a container listens on a private IP within a network address space allocated for that workload owner within an edge; this IP is not accessible directly by external endpoints 110, for security and control reasons. Once a connection is established, the API/micro-service routing module 1026 passes data back and forth between the external endpoint 110 and a code package, such as a container until the connection completes, violates a policy, or fails.

A request hostname determines the code package, provided that the hostname corresponds to a valid service name running within the edge 106. If the hostname is not valid, the request is logged and reported, and an error message is returned.

The API/micro-service routing module 1026 records properties of the request message and its reply, including information about the resource accessed, such as by the Uniform Resource Identifier (URI), user and/or external endpoint information, message size, and application response timing information. This information can be relayed back to the administrative UI module 502 for presentation to the workload owner. This information also can be sent as a log file or stream to a workload owner data collection and analysis system. This information is helpful to understand external endpoint and application behavior.

It will be appreciated that certain messages for a given workload hostname will be more appropriately handled by an external server instance, rather than within each edge location. One example is a message requiring authentication of the endpoint or the user of the endpoint, where the authentication database of identities and authenticators (for example passwords) are better held in a centralized location, or provided by an external identity proofing service, rather than being replicated to each edge location. In this example an unauthenticated message would be routed to the authentication service, which performs its function. As a result of authentication, a subsequent request from that endpoint may carry an authentication header, for example, causing the API/MS service to direct the authenticated request to an application workload instance within the edge.

Traffic Steering Flow

Figure 11:
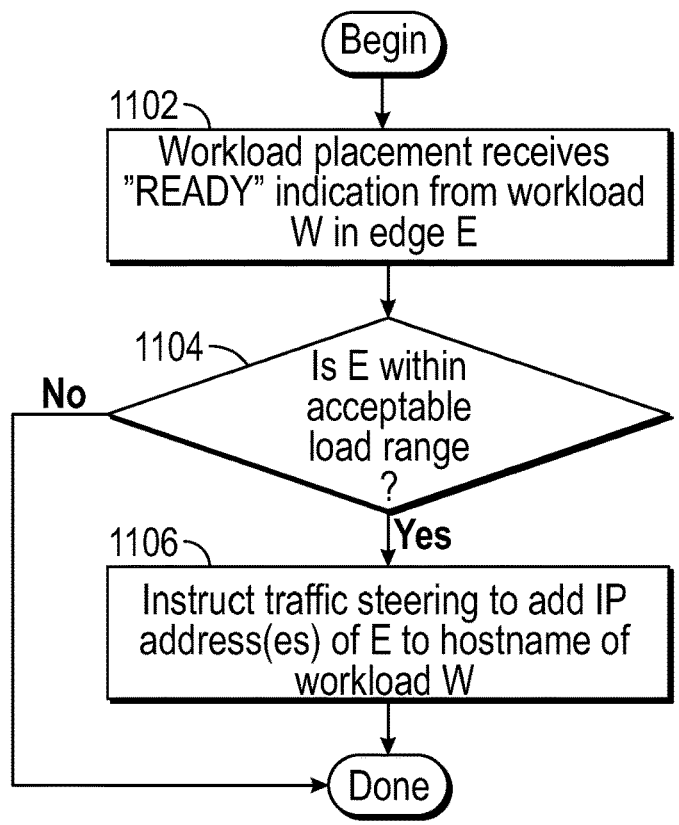
FIG. 11 is an illustrative flow diagram representing the workload placement manager of FIG. 5 configured to configure steering of external endpoint network traffic.

FIG. 11 is an illustrative flow diagram representing a workload placement manger 506 configured to configure steering of external endpoint network traffic. Upon receipt of a ready indication from a workload running in an edge, the workload placement manager 506 makes an assessment as to whether the edge is within an acceptable load range, for example below 80% utilization of each resource needed by the workload. In response to a determination that an edge is within an acceptable load range, the workload placement manager 506 instructs the traffic steering manager to add the target address for that edge 106, such as a set of IP addresses and corresponding geographic location information, such as latitude and longitude, and network location information, to the workload's set of target addresses.

The traffic steering manager 510 configures an address resolution service to return the target address most closely located with respect to an external endpoint requesting an address for a hostname. This is done, for example, by using an IP geolocation service that converts IP addresses into an approximate geographic location, expressed for example with a latitude and longitude. In this case the address resolution service identifies a target edge location with the lowest distance to the endpoint. In an example traffic steering manager 510, additional considerations are configured into the address resolution service, such as a consideration of current estimated aggregate resource utilization (as a load metric) for each edge location. With this information the address resolution service can eliminate an edge from consideration if its load exceeds a certain threshold, for example 80%.

More particularly, at module 1102, the workload placement manager 506 receives an indication from a workload W placed at an edge E that the workload is ready to operate and to accept messages from external endpoints. Decision module 1104 determines whether the edge E is within an acceptable load range. In response to a determination at decision module 1104 that the edge is within the acceptable load range, control flows to module 1106, which instructs the traffic steering manager 510 to associate in a table stored in a memory device (not shown), the IP address(es) of the edge E to a hostname of the workload W. In response to a determination at decision module 1104 that the edge is not within the acceptable load range, then the process ends without adding the edge to a set of edges to which to steer traffic.

Edge Metrics Reporting Flow

Figure 12:
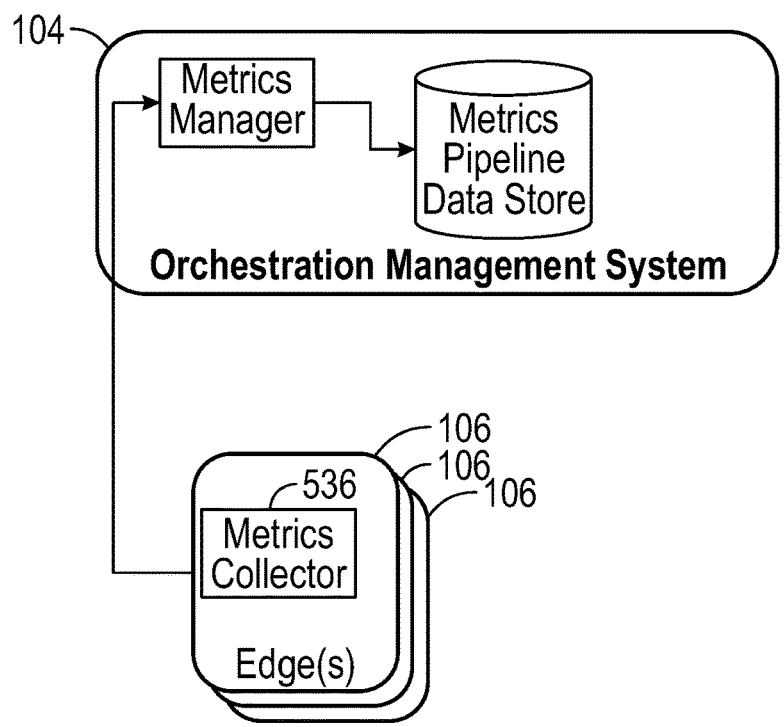
FIG. 12 is an illustrative simplified functional block diagram showing edge metrics collection clients sending data to the orchestration manager of FIG. 5 for storage in a metrics data store.
Figure 13:
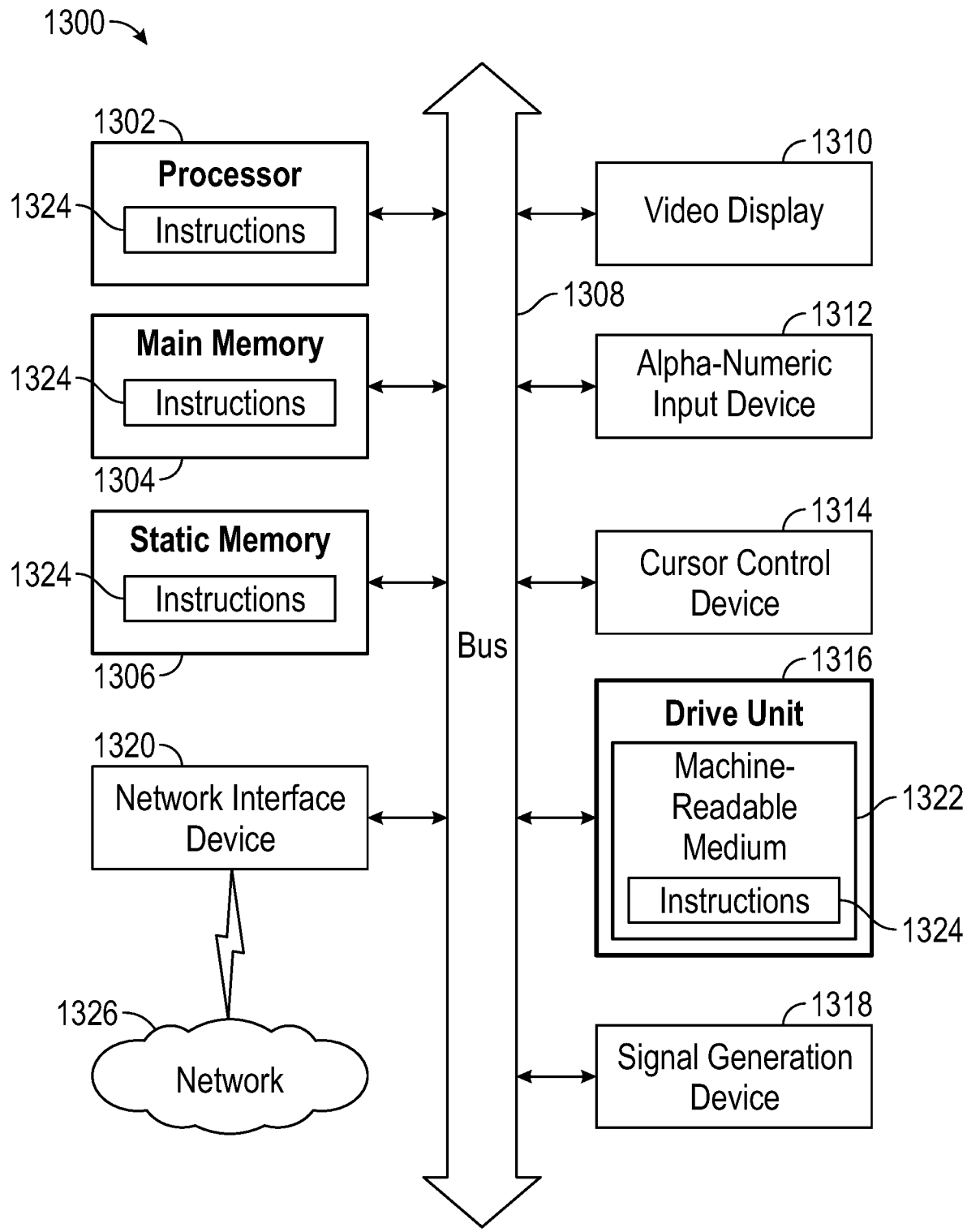
FIG. 13 is an illustrative block diagram of a computer processing system in which to implement the orchestration manager of FIG. 1 in accordance with some embodiments.

FIG. 12 is an illustrative simplified functional block diagram showing edge metrics collection clients 536 at multiple edges 106 sending data to the orchestration manager 104 for storage in the metrics pipeline data store 530. Various management services (e.g., admin UI module 502, workload placement manager 506, message server 508, resource allocation manager 504) within the orchestration manager 104 access this data to inform decisions about workload placement and traffic steering as described above; and to provide the information to network and system operators, such as those providing edge resources for the orchestration manager. Orchestration Manager Hardware Embodiment FIG. 13 is an illustrative block diagram of a computer processing system 1300 in which to implement the orchestration manager 104 of FIG. 1 in accordance with some embodiments. In some embodiments, the computer operates as a standalone device or may be connected (e.g., networked) to other computers. In a networked deployment, the computer may operate in the capacity of a server or a client computer in a server-client network environment, or as a peer computer in a peer-to-peer (or distributed) network environment, for example.

The example computer processing system 1300 includes a hardware processor 1322 (e.g., a central processing unit (CPU), a graphics processing unit (GPU) or both), main memory 1304 and static memory 1306, which communicate with each other via bus 1308. The processing system 1300 may further include video display unit 1320 (e.g., a plasma display, a liquid crystal display (LCD) or a cathode ray tube (CRT)). The processing system 2800 also includes alphanumeric input device 1322 (e.g., a keyboard), a user interface (UI) navigation device 1314 (e.g., a mouse, touch screen, or the like), a disk drive unit 1316, a signal generation device 1318 (e.g., a speaker), and a network interface device 1320.

The disk drive unit 1326, which can act as data storage 1325, includes computer-readable storage device 1322 on which is stored one or more sets of instructions and data structures (e.g., software 1324) embodying or utilized by any one or more of the methodologies or functions described herein. The software 1324 may also reside, completely or at least partially, within a computer readable storage device such as the main memory 1304 and/or within the processor 1322 during execution thereof by the processing system 1300, the main memory 1304 and the processor 1322 also constituting non-transitory computer-readable media. The software 1324 may further be transmitted or received over network 1326 via a network interface device 1320 utilizing any one of a number of well-known transfer protocols (e.g., HTTP).

The processing system 1302 is operably coupled to non-transitory computer readable media, 1304, 1306 and 1316. The non-transitory computer readable media store a plurality of instructions that are accessible to, and executable by, the processing system 1302. The plurality of instructions include instructions that when executed, configure the computer processing system 1300 to implement the administrative UI module 502, the resource allocation manager 504, the workload placement manager 506, the workload message server 508, the traffic steering module 510 and the operations UI module.

The above description is presented to enable any person skilled in the art to create and use a traffic aware network workload management system to adjustably place workloads at edge data centers. Various modifications to the examples will be readily apparent to those skilled in the art, and the generic principles defined herein may be applied to other examples and applications without departing from the spirit and scope of the invention. In the preceding description, numerous details are set forth for the purpose of explanation. However, one of ordinary skill in the art will realize that the examples in the disclosure might be practiced without the use of these specific details. In other instances, well-known processes are shown in block diagram form in order not to obscure the description of the invention with unnecessary detail. Identical reference numerals are used in some places to represent different views of the same or similar items in different drawings. Thus, the foregoing description and drawings of embodiments and examples are merely illustrative of the principles of the invention. Therefore, it will be understood that various modifications can be made to the embodiments by those skilled in the art without departing from the spirit and scope of the invention, which is defined in the appended claims.

The invention claimed is:

1. A system to manage operation of workloads over a workload placement network comprising: a plurality of respective clusters, which include respective compute and storage resources coupled to communicate over respective local cluster networks, wherein the respective clusters are coupled to send and receive messages over the workload placement network; a placement orchestration manager coupled to the workload placement network including: a user interface (UI) to receive respective workload placement specifications that indicate respective locations where to operate respective workloads; a data storage device medium storing respective cluster attribute information indicating respective cluster locations; and a workload placement manager to determine placement of respective workloads at respective clusters based at least in part upon, matching respective locations where to operate respective workloads, indicated in respective workload placement specifications, with respective cluster locations indicated by the stored respective cluster attribute information, and cluster resource utilization for respective workloads operating at the respective clusters; wherein the respective clusters include respective metrics collector instances operative to, collect information indicating respective cluster resource utilization for respective workloads operating at respective clusters; and send the information indicating the respective cluster resource utilization collected for respective workloads operating at the respective clusters over the workload placement network to the placement the orchestration manager.

2. The system of claim 1, wherein the placement orchestration manager further includes: a workload message server; wherein the respective clusters further include: respective cluster message clients; and respective cluster workload managers to manage configuration of clusters to operate workloads; wherein the workload message server is configured to pass messages between the workload placement manager and respective workload message clients; and wherein respective edge message clients are configured to pass messages between the workload message server and respective edge workload managers.

3. The system of claim 1, wherein the placement orchestration manager further includes: a workload message server; wherein the respective clusters further include: respective cluster message clients; and respective cluster workload managers to manage configuration of workloads to operate at respective clusters; wherein the workload message server is configured to pass messages between the workload placement manager and respective workload message clients to identify respective workloads to place at respective clusters; and wherein respective edge message clients are configured to pass messages between the workload message server and respective edge workload managers to configure respective workloads to operate at respective clusters.

4. The system of claim 1, wherein the placement orchestration manager further includes: a cluster resource allocation manager to maintain a snapshot of cluster resource utilization for respective workloads operating at the respective clusters.

5. The system of claim 1, wherein the placement orchestration manager further includes: a traffic steering manager to direct external endpoint messages to respective workloads, to respective clusters where the respective workloads operate.

6. The system of claim 1, wherein the placement orchestration manager coupled to the network includes: the UI to receive respective workload placement specifications that indicate respective locations where to operate respective workloads and that further indicate one or more cluster performance preferences; wherein respective clusters further include: respective cluster scheduler instances to configure cluster resources to operate respective workloads; and respective configuration translators to translate the one or more cluster performance preferences to respective cluster runtime configuration settings.

7. The system of claim 1, wherein at least one respective cluster further includes: a node including a first namespace allocated to a first respective workload and a second namespace allocated to a second respective workload.

8. The system of claim 1, wherein the placement orchestration manager coupled to the workload placement network includes: the UI to receive respective workload placement specifications that indicate respective locations where to operate respective workloads and that further indicate respective message latency objectives for respective workloads; the workload placement manager to determine placement of respective workloads at respective clusters based at least in part upon, matching respective locations where to operate respective workloads, indicated in respective workload placement specifications, with respective cluster locations indicated by the stored respective cluster attribute information, and cluster resource utilization for respective workloads operating at the respective clusters, and further upon, matching respective message latency objectives for respective workloads, indicated in respective workload placement specifications, with message latency between respective cluster locations, indicated by the stored respective attribute information, and respective external endpoint locations, wherein the respective edges further include respective metrics collector instances operative to collect, information indicating external endpoint locations that send messages over the workload placement network to respective workloads operating at respective clusters and to send the information indicating the respective external endpoint locations collected for respective workloads operating at the respective clusters over the workload placement network to the placement and orchestration manager.

9. The system of claim 1, wherein the placement orchestration manager coupled to the workload placement network includes: the UI to receive respective workload placement specifications that indicate respective locations where to operate respective workloads and that indicate respective cluster performance behavior to operate respective workloads; a data storage device medium storing respective cluster attribute information indicating respective cluster resource capacity information; and the workload placement manager to determine placement of respective workloads at respective clusters based at least in part upon, matching respective locations where to operate respective workloads, indicated in respective workload placement specifications, with respective cluster locations indicated by the stored respective cluster attribute information, and cluster resource utilization for respective workloads operating at the respective clusters, and further upon, matching respective cluster performance behavior, indicated in respective workload placement specifications, with respective cluster resource capacity information indicated by the stored respective cluster attribute information; wherein the respective edges further include respective metrics collector instances operative to collect, respective configuration translation instances to translate respective cluster performance behavior, indicated in respective workload placement specifications, to respective cluster resource configurations to operate respective workloads.

10. A system to manage operation of workloads over a workload placement network comprising: a plurality of respective clusters, which include respective compute and storage resources coupled to communicate over respective local cluster networks, wherein the respective clusters are coupled to send and receive messages over the workload placement network; a placement orchestration manager coupled to the workload placement network including: a user interface (UI) to receive respective workload placement specifications that indicate respective message latency objectives for respective workloads; a data storage device medium storing respective cluster attribute information indicating respective cluster locations; and a workload placement manager to determine placement of respective workloads at respective clusters based at least in part upon, matching respective message latency objectives for respective workloads, indicated in respective workload placement specifications, with message latency between respective cluster locations, indicated by the stored respective attribute information, and respective external endpoint locations, and cluster resource utilization for respective workloads operating at the respective clusters; wherein the respective edges include respective metrics collector instances operative to, collect information indicating respective cluster resource utilization for respective workloads operating at respective clusters; send the information indicating respective cluster resource utilization collected for respective workloads operating at the respective clusters over the workload placement network to placement the orchestration manager; collect information indicating external endpoint locations that send messages over the workload placement network to respective workloads operating at respective clusters; and send the information indicating the respective external endpoint locations collected for respective workloads operating at the respective clusters over the workload placement network to the placement and orchestration manager.

11. The system of claim 10, wherein the placement orchestration manager further includes: a workload message server; wherein the respective clusters further include: respective cluster message clients; and respective cluster workload managers to manage configuration of clusters to operate workloads; wherein the workload message server is configured to pass messages between the workload placement manager and respective workload message clients; and wherein respective edge message clients are configured to pass messages between the workload message server and respective edge workload managers.

12. The system of claim 10, wherein the placement orchestration manager further includes: a workload message server; wherein the respective clusters further include: respective cluster message clients; and respective cluster workload managers to manage configuration of workloads to operate at respective clusters; wherein the workload message server is configured to pass messages between the workload placement manager and respective workload message clients to identify respective workloads to place at respective clusters; and wherein respective edge message clients are configured to pass messages between the workload message server and respective edge workload managers to configure respective workloads to operate at respective clusters.

13. The system of claim 10, wherein the placement orchestration manager further includes: a cluster resource allocation manager to maintain a snapshot of cluster resource utilization for respective workloads operating at the respective clusters.

14. The system of claim 10, wherein the placement orchestration manager further includes: a traffic steering manager to direct external endpoint messages to respective workloads, to respective clusters where the respective workloads operate.

15. The system of claim 10, wherein the placement orchestration manager coupled to the workload placement network includes: the UI to receive respective workload placement specifications that indicate respective locations where to operate respective workloads and that further indicate one or more cluster performance preferences; wherein respective clusters further include: respective cluster scheduler instances to configure cluster resources to operate respective workloads; and respective configuration translators to translate the one or more cluster performance preferences to respective cluster runtime configuration settings.

16. The system of claim 10, wherein at least one respective cluster further includes: a node including a first namespace allocated to a first respective workload and a second namespace allocated to a second respective workload.

17. The system of claim 10, wherein the placement orchestration manager coupled to the workload placement network includes: the user interface (UI) to receive respective workload placement specifications that indicate respective message latency objectives for respective workloads that further indicate respective cluster performance behavior to operate respective workloads; a data storage device medium storing respective cluster attribute information indicating respective cluster resource capacity information; and the workload placement manager to determine placement of respective workloads at respective clusters based at least in part upon, matching respective message latency objectives for respective workloads, indicated in respective workload placement specifications, with message latency between respective cluster locations, indicated by the stored respective attribute information, and respective external endpoint locations, and cluster resource utilization for respective workloads operating at the respective clusters, and further upon, matching respective cluster performance behavior, indicated in respective workload placement specifications, with respective cluster resource capacity information indicated by the stored respective cluster attribute information; wherein the respective clusters include: respective configuration translation instances to translate respective cluster performance behavior, indicated in respective workload placement specifications, to respective cluster resource configurations to operate respective workloads.

18. A system to manage operation of workloads over a workload placement network comprising: a plurality of respective clusters, which include respective compute and storage resources coupled to communicate over respective local cluster networks, wherein the respective clusters are coupled to the workload placement network; a placement orchestration manager coupled to the workload placement network including: a user interface (UI) to receive respective workload placement specifications that indicate respective cluster performance behavior to operate respective workloads; a data storage device medium storing respective cluster attribute information indicating respective cluster resource capacity information; and a workload placement manager to determine placement of respective workloads at respective clusters based at least in part upon, matching respective cluster performance behavior, indicated in respective workload placement specifications, with respective cluster resource capacity information indicated by the stored respective cluster attribute information, and edge resource utilization for respective workloads operating at the respective clusters; wherein the respective clusters include: respective configuration translation instances to translate respective cluster performance behavior, indicated in respective workload placement specifications, to respective cluster resource configurations to operate respective workloads; respective metrics collector instances operative to collect information indicating respective cluster resource utilization for respective workloads operating at respective clusters and to send the information indicating the respective cluster resource utilization collected for respective workloads operating at the respective clusters over the workload placement network to the placement the orchestration manager.

19. The system of claim 18, wherein the placement orchestration manager further includes: a workload message server; wherein the respective clusters further include: respective cluster message clients; and respective cluster workload managers to manage configuration of clusters to operate workloads; wherein the workload message server is configured to pass messages between the workload placement manager and respective workload message clients; and wherein respective edge message clients are configured to pass messages between the workload message server and respective edge workload managers.

20. The system of claim 18, wherein the placement orchestration manager further includes: a workload message server; wherein the respective clusters further include: respective cluster message clients; and respective cluster workload managers to manage configuration of workloads to operate at respective clusters; wherein the workload message server is configured to pass messages between the workload placement manager and respective workload message clients to identify respective workloads to place at respective clusters; and wherein respective edge message clients are configured to pass messages between the workload message server and respective edge workload managers to configure respective workloads to operate at respective clusters.

21. The system of claim 18, wherein the placement orchestration manager further includes: a cluster resource allocation manager to maintain a snapshot of cluster resource utilization for respective workloads operating at the respective clusters.

22. The system of claim 18, wherein the placement orchestration manager further includes: a traffic steering manager to direct external endpoint messages to respective workloads, to respective clusters where the respective workloads operate.

23. The system of claim 18, wherein respective clusters further include: respective cluster scheduler instances to configure cluster resources to operate respective workloads; and respective configuration translators to translate the one or more cluster performance preferences to respective cluster runtime configuration settings.

24. The system of claim 18, wherein at least one respective cluster further includes: a node including a first namespace allocated to a first respective workload and a second namespace allocated to a second respective workload.

25. A method to manage, over a workload placement network, operation of workloads at a plurality of respective clusters, which include respective compute and storage resources coupled to communicate over respective local cluster networks, wherein the respective clusters are coupled to send and receive messages over the workload placement network, the method comprising: receiving at a placement orchestration manager, respective workload placement specifications that indicate respective locations where to operate respective workloads; storing at a data storage device medium respective cluster attribute information indicating respective cluster locations; determining at the placement orchestration manager, respective placement of respective workloads at respective clusters based at least in part upon, matching respective locations where to operate respective workloads, indicated in respective workload placement specifications, with respective cluster locations indicated by the stored respective cluster attribute information, and cluster resource utilization for respective workloads operating at the respective clusters; collecting at respective clusters, information indicating respective cluster resource utilization for respective workloads operating at respective clusters; and sending by respective clusters, the information indicating the respective cluster resource utilization collected for respective workloads operating at the respective clusters over the workload placement network to the placement the orchestration manager.

26. The method of claim 25 further including: placing one or more respective workloads, over the workload placement network, at respective clusters based upon the determined respective placement of the respective workloads.

27. The method of claim 25 further including: adjusting placement of one or more workloads, over the workload placement network, at respective clusters based upon the determined respective placement of the respective workloads.

28. The method of claim 25 further including: maintaining a snapshot of cluster resource utilization for respective workloads operating at the respective clusters.

29. The method of claim 25 further including: steering external endpoint messages to respective workloads, to respective clusters where the respective workloads operate steering external endpoints to respective edges operate.

30. The method of claim 25 further including: receiving at a placement orchestration manager, the respective workload placement specifications that indicate respective locations where to operate respective workloads and that further indicate one or more cluster performance preferences; and translating the one or more cluster performance preferences to respective cluster runtime configuration settings.

31. The method of claim 25 further including: allocating a first namespace of a respective cluster to a first respective workload and allocating a second namespace of the respective cluster to a second respective workload.

32. A method to manage over a workload placement network, operation of workloads at a plurality of respective clusters, which include respective compute and storage resources coupled to communicate over respective local cluster networks, wherein the respective clusters are coupled to send and receive messages over the workload placement network, the method comprising: receiving at a placement orchestration manager, respective workload placement specifications that indicate respective latency objectives for respective workloads; a user interface (UI) to receive respective workload placement specifications that indicate respective message latency objectives for respective workloads; storing at a data storage device medium, respective cluster attribute information indicating respective cluster locations; and determining at the placement orchestration manager, respective placement of respective workloads at respective clusters based at least in part upon, matching respective message latency objectives for respective workloads, indicated in respective workload placement specifications, with message latency between respective cluster locations, indicated by the stored respective attribute information, and respective external endpoint locations, and cluster resource utilization for respective workloads operating at the respective clusters; collecting at respective clusters, information indicating respective cluster resource utilization for respective workloads operating at respective clusters; sending by respective clusters the information indicating respective cluster resource utilization collected for respective workloads operating at the respective clusters over the workload placement network to placement the orchestration manager; collecting at respective clusters, information indicating external endpoint locations that send messages over the workload placement network to respective workloads operating at respective clusters; and sending by respective clusters, the information indicating the respective external endpoint locations collected for respective workloads operating at the respective clusters over the workload placement network to the placement and orchestration manager.

33. The method of claim 32 further including: placing one or more respective workloads, over the workload placement network, at respective clusters based upon the determined respective placement of the respective workloads.

34. The method of claim 32 further including: adjusting placement of one or more workloads, over the workload placement network, at respective clusters based upon the determined respective placement of the respective workloads.

35. The method of claim 32 further including: maintaining a snapshot of cluster resource utilization for respective workloads operating at the respective clusters.

36. The method of claim 32 further including: steering external endpoint messages to respective workloads, to respective clusters where the operate steering respective workloads operate steering external endpoints to respective edges operate.

37. The method of claim 32 further including: receiving at a placement orchestration manager, the respective workload placement specifications that indicate respective locations where to operate respective workloads and that further indicate one or more cluster performance preferences; and translating the one or more cluster performance preferences to respective cluster runtime configuration settings.

38. The method of claim 32 further including: allocating a first namespace of a respective cluster to a first respective workload and allocating a second namespace of the respective cluster to a second respective workload.

39. A method to manage over a workload placement network, operation of workloads at a plurality of respective clusters, which include respective compute and storage resources coupled to communicate over respective local cluster networks, wherein the respective clusters are coupled to send and receive messages over the workload placement network, the method comprising: receiving at a placement orchestration manager, respective workload placement specifications that indicate respective cluster performance behavior to operate respective workloads; storing at a data storage device medium respective cluster attribute information indicating respective cluster resource capacity information; determining at the placement orchestration manager, respective placement of respective workloads at respective clusters based at least in part upon, matching respective cluster performance behavior, indicated in respective workload placement specifications, with respective cluster resource capacity information indicated by the stored respective cluster attribute information, and edge resource utilization for respective workloads operating at the respective clusters; translating at respective clusters, respective cluster performance behavior, indicated in respective workload placement specifications, to respective cluster resource configurations to operate respective workloads at the respective clusters; collecting at respective clusters information indicating respective cluster resource utilization for respective workloads operating at respective clusters; and sending by respective clusters, the information indicating the respective cluster resource utilization collected for respective workloads operating at the respective clusters over the workload placement network to the placement the orchestration manager.

40. The method of claim 39 further including: placing one or more respective workloads, over the workload placement network, at respective clusters based upon the determined respective placement of the respective workloads.

41. The method of claim 39 further including: adjusting placement of one or more workloads, over the workload placement network, at respective clusters based upon the determined respective placement of the respective workloads.

42. The method of claim 39 further including: maintaining a snapshot of cluster resource utilization for respective workloads operating at the respective clusters.

43. The method of claim 39 further including: steering external endpoint messages to respective workloads, to respective clusters where the respective workloads operate steering external endpoints to respective edges operate.

44. The method of claim 39 further including: receiving at a placement orchestration manager, the respective workload placement specifications that indicate respective locations where to operate respective workloads and that further indicate one or more cluster performance preferences; and translating the one or more cluster performance preferences to respective cluster runtime configuration settings.

45. The method of claim 39 further including: allocating a first namespace of a respective cluster to a first respective workload and allocating a second namespace of the respective cluster to a second respective workload.

46. A system to manage workloads over a workload placement network comprising: a plurality of respective clusters, which include respective compute and storage resources coupled to communicate over respective local cluster networks, wherein the respective clusters are coupled to send and receive messages over the workload placement network; a placement orchestration manager coupled to the workload placement network including a processor and a non-transitory computer readable medium operably coupled thereto, the non-transitory computer readable medium comprising a plurality of instructions stored in association therewith that are accessible to, and executable by, the processor, where the plurality of instructions that, when executed, cause performance of a process that includes: receiving respective workload placement specifications that indicate respective locations where to operate respective workloads; storing at a data storage device medium respective cluster attribute information indicating respective cluster locations; determining at the placement orchestration manager, respective placement of respective workloads at respective clusters based at least in part upon, matching respective locations where to operate respective workloads, indicated in respective workload placement specifications, with respective cluster locations indicated by the stored respective cluster attribute information, and cluster resource utilization for respective workloads operating at the respective clusters; wherein the respective clusters include respective processor and respective non-transitory computer readable medium operably coupled thereto, the non-transitory computer readable medium comprising a plurality of instructions stored in association therewith that are accessible to, and executable by, the processor, where the plurality of instructions that, when executed, cause performance of a process that includes: collecting information indicating respective cluster resource utilization for respective workloads operating at respective clusters; and sending the information indicating the respective cluster resource utilization collected for respective workloads operating at the respective clusters over the workload placement network to the placement the orchestration manager.

47. The method of claim 46 further including: placing one or more respective workloads, over the workload placement network, at respective clusters based upon the determined respective placement of the respective workloads.

48. The method of claim 46 further including: adjusting placement of one or more workloads, over the workload placement network, at respective clusters based upon the determined respective placement of the respective workloads.

49. The method of claim 46 further including: maintaining a snapshot of cluster resource utilization for respective workloads operating at the respective clusters.

50. The method of claim 46 further including: steering external endpoint messages to respective workloads, to respective clusters where the respective workloads operate steering external endpoints to respective edges operate.

51. The method of claim 46 further including: receiving at a placement orchestration manager, the respective workload placement specifications that indicate respective locations where to operate respective workloads and that further indicate one or more cluster performance preferences; and translating the one or more cluster performance preferences to respective cluster runtime configuration settings.

52. The method of claim 46 further including: allocating a first namespace of a respective cluster to a first respective workload and allocating a second namespace of the respective cluster to a second respective workload.

53. A system to manage workloads over a workload placement network comprising: a plurality of respective clusters, which include respective compute and storage resources coupled to communicate over respective local cluster networks, wherein the respective clusters are coupled to send and receive messages over the workload placement network; a placement orchestration manager coupled to the workload placement network including a processor and a non-transitory computer readable medium operably coupled thereto, the non-transitory computer readable medium comprising a plurality of instructions stored in association therewith that are accessible to, and executable by, the processor, where the plurality of instructions that, when executed, cause performance of a process that includes: receiving at a placement orchestration manager, respective workload placement specifications that indicate respective latency objectives for respective workloads; a user interface (UI) to receive respective workload placement specifications that indicate respective message latency objectives for respective workloads; storing at a data storage device medium, respective cluster attribute information indicating respective cluster locations; and determining at the placement orchestration manager, respective placement of respective workloads at respective clusters based at least in part upon, matching respective message latency objectives for respective workloads, indicated in respective workload placement specifications, with message latency between respective cluster locations, indicated by the stored respective attribute information, and respective external endpoint locations, and cluster resource utilization for respective workloads operating at the respective clusters; wherein the respective clusters include respective processors and respective non-transitory computer readable medium operably coupled thereto, the non-transitory computer readable medium comprising a plurality of instructions stored in association therewith that are accessible to, and executable by, the processor, where the plurality of instructions that, when executed, cause performance of a process that includes: collecting at respective clusters, information indicating respective cluster resource utilization for respective workloads operating at respective clusters; sending by respective clusters the information indicating respective cluster resource utilization collected for respective workloads operating at the respective clusters over the workload placement network to placement the orchestration manager; collecting at respective clusters, information indicating external endpoint locations that send messages over the workload placement network to respective workloads operating at respective clusters; and sending by respective clusters, the information indicating the respective external endpoint locations collected for respective workloads operating at the respective clusters over the workload placement network to the placement and orchestration manager.

54. The method of claim 53 further including: placing one or more respective workloads, over the workload placement network, at respective clusters based upon the determined respective placement of the respective workloads.

55. The method of claim 53 further including: adjusting placement of one or more workloads, over the workload placement network, at respective clusters based upon the determined respective placement of the respective workloads.

56. The method of claim 53 further including: maintaining a snapshot of cluster resource utilization for respective workloads operating at the respective clusters.

57. The method of claim 53 further including: steering external endpoint messages to respective workloads, to respective clusters where the operate steering respective workloads operate steering external endpoints to respective edges operate.

58. The method of claim 53 further including: receiving at a placement orchestration manager, the respective workload placement specifications that indicate respective locations where to operate respective workloads and that further indicate one or more cluster performance preferences; and translating the one or more cluster performance preferences to respective cluster runtime configuration settings.

59. The method of claim 32 further including: allocating a first namespace of a respective cluster to a first respective workload and allocating a second namespace of the respective cluster to a second respective workload.

60. A system to manage workloads over a workload placement network comprising: a plurality of respective clusters, which include respective compute and storage resources coupled to communicate over respective local cluster networks, wherein the respective clusters are coupled to send and receive messages over the workload placement network; a placement orchestration manager coupled to the workload placement network including a processor and a non-transitory computer readable medium operably coupled thereto, the non-transitory computer readable medium comprising a plurality of instructions stored in association therewith that are accessible to, and executable by, the processor, where the plurality of instructions that, when executed, cause performance of a process that includes: receiving at a placement orchestration manager, respective workload placement specifications that indicate respective cluster performance behavior to operate respective workloads; storing at a data storage device medium respective cluster attribute information indicating respective cluster resource capacity information; determining at the placement orchestration manager, respective placement of respective workloads at respective clusters based at least in part upon, matching respective cluster performance behavior, indicated in respective workload placement specifications, with respective cluster resource capacity information indicated by the stored respective cluster attribute information, and edge resource utilization for respective workloads operating at the respective clusters; wherein the respective clusters include respective processors and respective non-transitory computer readable medium operably coupled thereto, the non-transitory computer readable medium comprising a plurality of instructions stored in association therewith that are accessible to, and executable by, the processor, where the plurality of instructions that, when executed, cause performance of a process that includes: translating at respective clusters, respective cluster performance behavior, indicated in respective workload placement specifications, to respective cluster resource configurations to operate respective workloads at the respective clusters; collecting at respective clusters information indicating respective cluster resource utilization for respective workloads operating at respective clusters; and sending by respective clusters, the information indicating the respective cluster resource utilization collected for respective workloads operating at the respective clusters over the workload placement network to the placement the orchestration manager.

61. The method of claim 60 further including: placing one or more respective workloads, over the workload placement network, at respective dusters based upon the determined respective placement of the respective workloads.

62. The method of claim 60 further including: adjusting placement of one or more workloads, over the workload placement network, at respective clusters based upon the determined respective placement of the respective workloads.

63. The method of claim 60 further including: maintaining a snapshot of cluster resource utilization for respective workloads operating at the respective clusters.

64. The method of claim 60 further including: steering external endpoint messages to respective workloads, to respective clusters where the respective workloads operate steering external endpoints to respective edges operate.

65. The method of claim 60 further including: receiving at a placement orchestration manager, the respective workload placement specifications that indicate respective locations where to operate respective workloads and that further indicate one or more cluster performance preferences; and translating the one or more cluster performance preferences to respective cluster runtime configuration settings.

66. The method of claim 60 further including: allocating a first namespace of a respective cluster to a first respective workload and allocating a second namespace of the respective cluster to a second respective workload.

* * * * *

UNITED STATES PATENT AND TRADEMARK OFFICE
CERTIFICATE OF CORRECTION

PATENT NO. : 10,791,168 B1
APPLICATION NO. : 16/418384
DATED : September 29, 2020
INVENTOR(S) : Dilley et al.

It is certified that error appears in the above-identified patent and that said Letters Patent is hereby corrected as shown below:

On the Title Page

Item (72), in "Inventors", in Column 1, Line 1, delete "Los Alto," and insert --Los Altos,-- therefor In the Claims In Column 37, Line 40, in Claim 8, delete "specilications," and insert --specifications,-- therefor In Column 42, Line 45, in Claim 36, after "the", delete "operate steering"

In Column 45, Line 51, in Claim 57, after "the", delete "operate steering"

In Column 46, Line 47, in Claim 61, delete "dusters" and insert --clusters-- therefor Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*